United States Patent
Stark et al.

(10) Patent No.: US 8,706,904 B1
(45) Date of Patent: *Apr. 22, 2014

(54) INDIVIDUAL XML MESSAGE PROCESSING PLATFORM

(75) Inventors: Juergen Stark, Glencoe, IL (US); Craig Goren, Chicago, IL (US)

(73) Assignee: West Notifications, Inc., Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/765,383

(22) Filed: Apr. 22, 2010

Related U.S. Application Data

(60) Continuation of application No. 11/432,896, filed on May 12, 2006, now Pat. No. 7,809,855, which is a division of application No. 09/661,499, filed on Sep. 14, 2000, now Pat. No. 7,062,535.

(60) Provisional application No. 60/194,254, filed on Apr. 3, 2000.

(51) Int. Cl.
*G06F 15/173* (2006.01)

(52) U.S. Cl.
USPC ............................ 709/238; 709/206; 709/203

(58) Field of Classification Search
USPC .................................. 709/203–206, 245, 238
See application file for complete search history.

(56) References Cited

U.S. PATENT DOCUMENTS

| | | | |
|---|---|---|---|
| 5,073,852 A | 12/1991 | Siegel et al. | |
| 5,327,486 A | 7/1994 | Wolff et al. | |
| 5,400,020 A | 3/1995 | Jones et al. | |
| 5,579,472 A | 11/1996 | Keyworth, II et al. | |
| 5,623,260 A | 4/1997 | Jones | |
| 5,657,010 A | 8/1997 | Jones | |
| 5,668,543 A | 9/1997 | Jones | |
| 5,708,780 A | 1/1998 | Levergood et al. | |
| 5,742,763 A * | 4/1998 | Jones ............................ | 719/317 |
| 5,796,394 A | 8/1998 | Wicks et al. | |
| 5,805,810 A | 9/1998 | Maxwell | |
| 5,819,046 A | 10/1998 | Johnson | |

(Continued)

FOREIGN PATENT DOCUMENTS

| | | |
|---|---|---|
| EP | 792044 | 8/1997 |
| WO | WO0107624 | 10/2001 |

(Continued)

OTHER PUBLICATIONS

Arbanowski, Stefan and Van Der Meer, Sven, "Service Personalization for Unified Messaging Systems," Computers and Communications, 1999. Proceedings, IEEE International Symposium on Red Sea, Egypt Jul. 6-8, 1999, Los Alamitos, CA, USA, IEEE Comp. Soc., US, Jul. 6, 1999, pp. 156-163.

(Continued)

*Primary Examiner* — Wing F Chan
*Assistant Examiner* — Benjamin M Thieu

(57) ABSTRACT

A communications platform (Centerpost) provides a message processing platform along with an XML message format (SmartMessage) which provides for the reception, organization, summarization, filing, storage, synthesis, routing, formatting, and intelligent processing of XML-based electronic messages and SMTP electronic mail from corporations and other senders to fully integrate individuals' existing e-mail boxes, cellular telephones, paging equipment, facsimile machines, wireless and wired telephones, and other devices. The Centerpost platform utilizes a nickname-based routing to enable device specific sending without knowledge of the specific device address.

19 Claims, 40 Drawing Sheets

(56) References Cited

U.S. PATENT DOCUMENTS

| | | | |
|---|---|---|---|
| 5,828,314 A | 10/1998 | Park | |
| 5,870,549 A | 2/1999 | Bobo, II | |
| 5,875,437 A | 2/1999 | Atkins | |
| 5,899,995 A * | 5/1999 | Millier et al. | 1/1 |
| 5,937,161 A | 8/1999 | Mulligan et al. | |
| 6,029,148 A | 2/2000 | Zurstrassen | |
| 6,052,673 A | 4/2000 | Leon et al. | |
| 6,073,166 A | 6/2000 | Forsen | |
| 6,147,977 A | 11/2000 | Thro et al. | |
| 6,151,624 A | 11/2000 | Teare et al. | |
| 6,154,738 A | 11/2000 | Call | |
| 6,157,945 A | 12/2000 | Balma et al. | |
| 6,167,409 A | 12/2000 | DeRose et al. | |
| 6,185,603 B1 | 2/2001 | Henderson et al. | |
| 6,212,550 B1 | 4/2001 | Segur | |
| 6,216,165 B1 | 4/2001 | Woltz et al. | |
| 6,219,714 B1 | 4/2001 | Inhwan et al. | |
| 6,278,936 B1 | 8/2001 | Jones | |
| 6,313,760 B1 | 11/2001 | Jones | |
| 6,314,402 B1 | 11/2001 | Monaco et al. | |
| 6,314,434 B1 * | 11/2001 | Shigemi et al. | 707/695 |
| 6,317,060 B1 | 11/2001 | Jones | |
| 6,347,340 B1 | 2/2002 | Coelho et al. | |
| 6,350,066 B1 | 2/2002 | Bobo, II | |
| 6,363,254 B1 | 3/2002 | Jones et al. | |
| 6,363,323 B1 | 3/2002 | Jones | |
| 6,411,891 B1 | 6/2002 | Jones | |
| 6,415,207 B1 | 7/2002 | Jones | |
| 6,430,272 B1 | 8/2002 | Maruyama et al. | |
| 6,430,604 B1 | 8/2002 | Ogle et al. | |
| 6,438,583 B1 | 8/2002 | McDowell et al. | |
| 6,442,589 B1 | 8/2002 | Takahashi et al. | |
| 6,442,591 B1 | 8/2002 | Haynes et al. | |
| 6,513,019 B2 * | 1/2003 | Lewis | 705/35 |
| 6,542,515 B1 * | 4/2003 | Kumar et al. | 370/463 |
| 6,748,569 B1 * | 6/2004 | Brooke et al. | 715/207 |
| 6,829,591 B1 | 12/2004 | Bresnan et al. | |
| 6,836,792 B1 * | 12/2004 | Chen | 709/220 |
| 6,892,230 B1 * | 5/2005 | Gu et al. | 709/220 |
| 6,963,929 B1 | 11/2005 | Lee | |
| 7,146,614 B1 * | 12/2006 | Nikols et al. | 719/313 |
| 7,149,893 B1 | 12/2006 | Leonard et al. | |
| 2002/0131561 A1 | 9/2002 | Gifford et al. | |
| 2003/0217176 A1 | 11/2003 | Beunings | |

FOREIGN PATENT DOCUMENTS

| | | |
|---|---|---|
| WO | WO0175604 | 10/2001 |
| WO | WO0176119 | 10/2001 |
| WO | WO0180130 | 10/2001 |

OTHER PUBLICATIONS

International Business Machines Corporation: "Multi-Modal Data Access" Research Disclosure, Kenneth Mason Publications, Hampshire, GB, vol. 426, No. 114, Oct. 1999, 8 pages.

Patel, Ahmed and Gaffney, Kevin, "A technique for multi-network access to multimedia messages," Computer Communications, Elsevier Science Publishers BV, Amersterdam, NL, vol. 20, No. 5, Jul. 1, 1997, pp. 324-337.

Van Der Meer, Sven, Arbanowski, Stefan and Magedanz, Dr. Thomas, "An Approach for a 4th Generation Messaging System," Autonomous Decentralized Systems, 1999. Integration of Heterogeneous Systems. Proceedings. The Fourth International Symposium on Tokyo, Japan, Mar. 21-23, 1999, Los Alamitos, CA USA, IEEE Comput. Soc., US, Mar. 21, 1999, 10 pages.

* cited by examiner

EXAMPLE CENTERPOST INTERACTIONS FOR AN INDIVIDUAL SUBSCRIBER
EXAMPLE PROCESSING RULES (for 1 subscriber)

| | Content | Example Processing Rules | 2-WAY POTENTIAL |
|---|---|---|---|
| Airlines | Booking confirmation | Send to assistant's email; update "folio" on Centerpost | |
| | Destination weather forecast | Send to home fax on evening prior to trip | |
| | Flight delay / cancellation | Send to pager and copy assistant's fax; to mobile phone on weekends | Rebook other flight |
| | Gate assignments | Send to pager; update PalmPilot schedule | |
| | Destination traffic alert | Send to pager; send to assistant's fax | |
| | Frequent flyer posting | Consolidate and send weekly summary to home email | |
| Brokers | Portfolio news | Send to home email; send urgent taglines to pager | Send details |
| | Closing prices | Send chart to work email; update "folio" on Centerpost; enable query | |
| | Stock alerts | Send to home email; send to PCS phone for extreme movements | Execute trade |
| | Trade alerts | Send to pager; request shares to buy/sell | Execute trade |
| | Trade expiration | Send to home email | Renew position |
| Banks and credit cards | Low balance | Send to home fax | Transfer funds |
| | Unusual activity | Send to pager; call home phone | Freeze account |
| | Account postings | Update "folio" on Centerpost; update Quicken register | |
| Retailers | Special promotions | Consolidate and send weekly summary on Fridays to home email | Purchase item |
| | Time sensitive promotions | Send to home email; delete when expired | Purchase item |
| | Ordered items arrived | Send to home fax | Hold at store |
| | Ordered items shipped | Send to home fax | |
| Shippers | Package signed for | Send to work email "shipments" folder; send to assistant's email | |
| | Package tracking | Update "folio" on Centerpost; enable query to folio | |
| Schools | Emergency contact | Send to all devices; also send to wife's Centerpost account | |
| | Test scores | Update "folio" on Centerpost | |
| | School events | Send to home email | |
| Technicians | Trouble alert | Follow escalation schedule; update central "folio" | Will respond |
| | Maintenance notification | Send to work email | |
| | Scheduling message | Send to pager | |
| Devices | Security system alert | Send to pager; ping wife's Centerpost; call neighbor phone | False alarm |
| | Power outage | Send to pager or cellphone | |
| | Equipment/network alarms | Follow escalation schedule; update central "folio" | Will respond |
| | GPS transmission | Update map on work PC | |
| People | Email | Route based on various criteria; send subject to pager if urgent | Reply to email |
| | Address update (from assistant) | Update address book on Palm VII, PCS phone, and home email | |
| | Schedule change (from assistant) | Update schedule on Palm VII; send to pager if urgent | |

FIG. 3C

```
- <smXML xmins="x-
    schema:http://www.devpost.com/schemas/SM/smXMLver1.1xdr" protocol-
    version="1.1" smartmessage-id="309324dadfAA" smartmessage-date="2000-04-
    21T14:30:55" informant-stylesheet-class="http://www.centerpost.com/"
    informant-stylesheet-version="definitions/centerpostInformant11.xml"
    smartmessage-stylesheet-class="http://www.devpost.com/" smartmessage-
    stylesheet-version="definitions/centerpostDef2.xml">
  - <route>
      <from reply-protocol="smtp" reply-address="admin@centerppost.com" from-
         address="cgoren@centerpost.com" />
      <to to-type="to" to-protocol="smtp" to-
         address="jbrunning@centerpost.com" />
      <receipt-request receipt-type="nak" receipt-event="processed" receipt-
         protocol="smtp" receipt-address="receipts@centerpost.com." />
    </route>
  - <activity activity-class="Welcome" activity-id="User9999" activity-
      url="http://www.centerpost.com" activity-title="Welcome to Centerpost"
      activity-status="Your account is now active." closed-date="2000-04-
      22T14:30:55'">
    - <activity-payload>
        <welcome xmlns="InformantsSchema" />
      </activity-payload>
    </activity>
  - <event event-class="Account Created" event-id="User9999" event-
      url="http://www.centerpost.com/userinfo.asp" event-description="Your new
      Centerpost account is now active for your use.">
    - <event-payload>
        <accountcreation xmlns="InformantsSchema" />
      </event-payload>
    </event>
  </smXML>
```

© 2000 Centerpost Corp.

FIG. 5

```
-<smInformantStylesheet xlms="x-
    schema:http://www.devpost.com/schemas/Def/smInformantStylesheetScehma1.1
    informant-name="Centerpost.com" informant-stylesheet-
    class="http://www.centerpost.com/" informant-stylesheet-
    version="definitions/InformantStylesheet1.1xml" informant-
    description="Centerpost.com, your messaging center." logo-
    url="http://www.centerpost.com/images/centerpost.gif" home-
    url="http://www.centerpost.com" informant-category="personal">
    <valid-transport-source transport-source="*@centerpost.com" transport-
        protocol="smtp />
    <valid-transport-source transport-source="*@demopost.com" transport-
        protocol="smtp />
    <valid-transport-source transport-source="*@devpost.com" transport-
        protocol="smtp />
    <valid-transport-source transport-protocol="*http" transport-
        source="63.140.145.*" />
</smInformantStylesheet>
```

© 2000 Centerpost Corp.

FIG. 7A

```
- <smSmartMessageStylesheet xmlns="x-
    schema:http://www.devpost.com/schemas/def/smstylesheetschema1.1.xdr"
    smartmessage-stylesheet-class="http://www.devpost.com/" smartmessage-
    stylesheet-version="definitions/centerpostdef2.xml">
  - <activity-class activity-name="Web Post" activity-duration="hours" event-
      frequency="once"
      <activity-payload-schema />
    - <activity-xsl-default>
        <xsl_default:stylesheet xmlns="http://www.w3.org/TR/REC-html40"
          xmlns:xsl_default="http://www.w3.org/TR/WD-xsl" />
      </activity-xsl-default>
    - <activity-xsl-endpoint endpoint-type="browser">
        <xsl_default:styleheet xmlns="http://www.w3.org/TR/REC-html40"
          xmlns:xsl_default="http://www.w3.org/TR/WD-xsl" />
      </activity-xsl-endpoint>
  - <event-class event-name="Emergency Reach" content="fyi"
      sensitivity="private" reach="individual" immediacy="minutes"
      expiration="minutes" frequency="once" context="personal">
    - <event-payload-schema>
      - <Schema name="payloadschema.xdr" xmlns="urn:schemas-
          microsoft-com:xml-data" xmlns:dt="urn:schemas-microsoft-
          com:datatypes">
        - <ElementType name="Emergency" content="eltOnly" order="seq">
            <element type="from" />
            <element type="emergencySummary" />
            <element type="emergencyDetail" />
            <element type="ContactName" />
            <element type="ContactInfo" />
          </ElementType>
          <ElementType name="from" content="textOnly" />
          <ElementType name="emergencySummary" content="textOnly" />
          <ElementType name="emergencyDetail" content="textOnly" />
          <ElementType name="ContactName" content="textOnly" />
          <ElementType name="ContactInfo" content="textOnly" />
        </Schem>
    </event-payload-schema>
    - <event-xsl-default>
      - <xsl_default:stylesheet xmlns="http://www.w3.org/TR/REC-html40"
          xmlns:xsl_default="http://www.w3.org/TR/WD-xsl">
        - <xsl_default:remplate match="/">
            <xsl_default:apply-templates select="EmergencyReach" />
          </xsl_default:template>
        - <xsl_default:template match="EmergencyReach">
            This is an Emergency Reach Centerpost SmartMessage!
            From:
            <xsl_default:value-of select="from" />
            Contact:
            <xsl_default:value-of select="ContactName" />
            Contact Information:
            <xsl_default:value-of select="ContactInfo" /
            Emergency Summary:
            <xsl_default:value-of select="emergencySummary" />
```

FIG. 7B-1

```
     (More details may have be included in your folio) send a
     SmartMessage at: http://www.centerpost.com/Post/
     </xsl_default:template>
    </xsl_default:stylesheet>
   </event-xsl-default>
  - <event-xsl-endpoint endpoint-type="html-email">
   - <xsl_default:stylesheet xmlns="http://www.w3.org/TR/REC-html40"
       xmlns:xsl_default="http://www.w3.org/TR/WD-xsl">
    - <xsl_default:template match="/">
        <xsl_default:apply-templates select="EmergencyReach" />
      </xsl_default:template>
    - <xsl_default:template match="EmergencyReach">
      -<HTML>
        - <HEAD>
          - <TITLE />
          </HEAD>
        - <BODY>
          - <FONT face="arial, helvetica">
            - <table cellpadding="0" cellspacing="0" border="0">
              - <tr>
                - <td>
                    <img
                      src="http://www.centerpost.com/images/home/cplogo_big2.g
                  </td>
                </tr>
              </table>
              <BR />
              <BR />
              This is an emergency reach message from
            - <b>
                <xsl_default:value-of select="from />
              </b>
              <BR />
              <BR />
              <BR />
            - <table cellpadding="0" cellspacing="0" border="0">
              -  <TR>
                  <TD>Message title:</TD>
                <TR>
              - <TR>
                - <TD>
                  - <FONT color="red">
                      <xsl_default:value-of
                         select="emergencySummary" />
                    </FONT>
                  </TD>
                </TR>
              - <TR>
                - <TD>
                    <BR />
                  </TD>
                </TR>
              - <TR>
```

FIG. 7B-2

```
            - <TD>
                Message Text:
                <BR />
              </TD>
            </TR>
          - <TR>
            - <TD>
              - <FONT color="red">
                  <xsl_default:value-of
                    select="emergencyDetail" />
                </FONT>
              </TD>
            </TR>
          - <TR>
            - <TD>
                <BR />
              </TD>
            </TR>
          - </TR>
            - <TD>
                Please contact
              - <FONT color="red">
                  <xsl_default:value-of
                    select="ContactPerson" />
                </FONT>
              </TD>
            </TR>
          - <TR>
          -   <TR>
            - <TD>
                at:
              - <FONT color="red">
                  <xsl_default:value-of
                    select="ContactInfo" />
                </FONT>
              </TD>
            </TR>
          </TABLE>
        </FONT>
      </BODY>
    </HTML>
    </xsl_default:template>
  </xsl_default:stylesheet>
</event-xsl-endpoint>
- <event-xsl-endpoint endpoint-type="browser">
  - <xsl_default:stylesheet xmlns="http://www.w3.org/TR/REC-html40"
      xmlns:xsl_default="http://www.w3.org/TR/WD-xsl">
    - <xsl_default:template match="/">
        <xsl_default:apply-templates select="EmergencyReach" />
      </xsl_default:template>
    - <xsl_default:template match="EmergencyReach">
      - <HTML>
          <HEAD />
        - <BODY>
```

FIG. 7B-3

```
- <FONT face="arial, helvetica >
  - <table "cellpadding="0"cellpspacing="0" border="0">
     - <tr>
       - <td>
           <img
              src="http://www.centerpost.com/images/images/home/cplogo_bg2.g
           </td>
        </tr>
     </table>
     <BR/>
     <BR/>
     This is emergency reach message from
     - <b>
         <xsl_default:value-of select="from" />
       </b>
       <BR/>
       <BR/>
       <BR/>
     - <TABLE cellpadding="0"  cellspacing="0" border="0">
     - <TR>
         <TD>Message title:</TD>
       </TR>
     - <TR>
        - <TD>
          - <FONT color="red">
              <xsl_default:value-of
                 select="emergencySummary" />
             </FONT>
          </TD>
        </TR>
      - <TR>
        - <TD>
            <BR />
          </TD>
        </TR>
      - <TR>
        - <TD>
            Message Text:
            <BR />
          </TD>
        </TR>
      - <TR>
        - <TD>
          - <FONT color="red">
              <xsl_default:value-of
                 select= "emergencyDetail" />
            </FONT>
          </TD>
        </TR>
      - <TR>
        - <TD>
            <BR/>
          </TD>
```

FIG. 7B-4

```
                <TR>
              - <TR>
                    <TD>Additional Contact Information: </TD>
                </TR>
              - <TR>
                  - <TD>
                      - <FONT color="red">
                            <xsl_default:value-of
                                select="ContactInfo" />
                        </FONT>
                    </TD>
                </TR>
            </TABLE>
        </FONT>
    </BODy>
  </HTML>
          </xsl_default:template>
        </xsl_default:stylesheet>
      </event-xsl-endpoint>
  </event-class>
- <event-class event-name="HELLO" frequency="once" sensitivity="normal"
    reach="individual" content="statement" immediacy= "days"
    expiration="days" context="personal">
  - <event-payload-schema>
    - <Schema name="payloadschema.xdr" xmlns="urn:scehmas-
          microsoft-com:xml-data" xmlns: dt-"urn:schemas-microsoft-
          com:datatypes">
      - <ElementType name= "SayHello" content="eltOnly" order="seq">
            <element type= "from"/>
            <element type= "shortHello"/>
            <element type= "longHello"/>
        </ElementType>
        <ElementType name= "from" content="textOnly" />
        <ElementType name= "shortHello" content="textOnly" />
        <ElementType name= "longHello" content="textOnly" />
      </Schema>
    </event-payload-shema>
  - <even-xsl-default>
    - <xsl_default:stylesheet xmlns="http://www.w3.org/TR/REC-html40"
        xmlns:xsl_default="http://www.w3.org/TR/WD-xsl">
      - <xsl_default:template match="/">
            <xsl_default:apply-templates select="SayHello" />
        </xsl_default:template>
      - <xsl_default:template match="SayHello">
            This is a 'Hello' message from
            <xsl_default:value-of select="from" />
            They wanted to say
            <xsl_default:value-of select="shortHello" />
            (More details may have be included in your folio) send a
            SmartMessage at: http://www.centerpost.com/Post/
        </xsl_default:templare>
      </xsl_default:stylesheet>
    </event-xsl-default>
```

FIG. 7B-5

```xml
- <event-xsl-endpoint endpoint-type+"html-email">
  - <xsl_default:stylesheet xml="http://www.w3.org/TR/REC-html40"
        xmlns:xsl_default="http://www.w3.org/TR/WD-xsl">
    - <xsl_default:template match="/">
        <xsl_default:apply-templates select="SayHello" />
      </xsl_default:template>
    - <xsl_default:template match="EmergencyReach">
      - <HTML>
        - <BODY>
          - <FONT face="arial, helvectica">
            - <table cellpadding="0" cellspacing="0" border="0">
              - <tr>
                - <td>
                    <img
                        src="http://www.centerpost.com/images/home/cplogo_big2.g
                  </td>
                </tr>
              </table>
              <BR />
              <BR />
              This is a 'Hello' SmartMessage from
            - <b>
                <xsl_default:value-of select="from" />
              </b>
              <BR />
              <BR />
              <BR />
            - <TABLE cellpadding="0" cellspacing="0" border="0">
              - <TR>
                  <TD>They wanted to say</TD>
                </TR>
              - <TR>
                - <TD>
                  - <FONT color="red">
                      <xsl_default:value-of
                          select="longHello" />
                    </FONT>
                  </TD>
                </TR>
              - <TR>
                - <TD>
                    <BR />
                  </TD>
                </TR>
              </TABLE>
            </FONT>
          </BODY>
        </HTML>
      </xsl_default:template>
    </xsl_default:stylesheet>
  </event-xsl-endpoint>
- <event-xsl-endpoint endpoint-type="browser">
  - <xsl_default:stylesheet xmlns="http://www.w3.org/TR/REC-html40"
```

FIG. 7B-6

```
                    xmlns:xsl_default="http://www.w3.org/TR/WD-xsl">
                  - <xsl_default:template match="/">
                       <xsl_default:apply-templates select="EmergencyReach" />
                    </xsl_default:template>
                  - <xsl_default:template match="EmergencyReach">
                     - <HTML>
                        - <BODY>
                           - <FONT face="arial, helvetica">
                              - <table cellpadding="0" cellspacing="0" border="0">
                                 - <tr>
                                    - <td>
                                         <img
                                             src="http://www.centerpost.com/images/home/cplogo_big2.g
                                      </td>
                                   </tr>
                                </table>
                                <BR />
                                <BR />
                                This is a 'Hello' SmartMessage from
                              - <b>
                                   <xsl_default:value-of select="from" />
                                </b>
                                <BR />
                                <BR />
                                <BR />
                              - <TABLE cellpadding="0" cellspacing="0" border="0">
                                 - <TR>
                                      <TD>They wanted to say</TD>
                                   </TR>
                                 - <TR>
                                    - <TD>
                                       - <FONT color="red">
                                            <xsl_default:value-of
                                              select="longHello" />
                                         </FONT>
                                      </TD>
                                   </TR>
                                 - <TR>
                                    - <TD>
                                         <BR />
                                      </TD>
                                   </TR>
                                </TABLE>
                             </FONT>
                          </BODY>
                       </HTML>
                    </xsl_default:template>
                 </xsl_default:stylesheet>
              </event-xsl-endpoint>
           </event-class>
        </activity-class>
      - <activity-class activity-name="Announcements" activity-duration="ongoing" event-
           frequency="monthly">
```

FIG. 7B-7

```xml
- <activity-xsl-default>
    <xsl_default:stylesheet xmlns="http://www.w3.org/TR/REC-html40"
        xmlns:xsl_default="http://www.w3.org/TR/WD-xsl">
  </activity-xsl-default>
- <event-class event-name="Welcome" frequency="once" sensitivity="normal"
    reach="individual" content="statement" immediacy="days"
    expiration="days" context="personal">
    - <event-payload-schema>
        - <Schema name="payloadschema.xdr" xmlns="urn:schemas-
            microsoft-com:xml-data" xmlns:dt="urn:schemas-microsoft-
            com:datatypes">
            - <ElementType name="Welcome" content="eltOnly" order="seq">
                <element type="EndpointName" />
                <element type="Message" />
            </ElementType>
            <ElementType name="EndpointName" content="textOnly" />
            <ElementType name="Message" content="textOnly" />
        </Schem>
    </event-payload-schema>
    - <event-xsl-default>
        - <xsl_default:stylesheet xmlns="http://www.w3.org/TR/REC-html40"
            xmlns:xsl_default="http://www.w3.org/TR/WD-xsl">
            - <xsl_default:remplate match="/">
                <xsl_default:apply-templates select="Announcements" />
            </xsl_default:template>
            - <xsl_default:template match="Announcements"> Welcome to
                Centerpost! Congratulations, you've just received your first
                smart message. This test message was sent to all of your
                endpoints</xsl_default:template>
            <xsl_default:stylesheet>
    </event-xsl-default>
    - <event-xsl-endpoint endpoint-type="html-email">
        - <xsl_default:stylesheet xmlns="http://www.w3.org/TR/REC-html40"
            xmlns:xsl_default="http://www.w3.org/TR/WD-xsl">
            - <xsl_default:template match="/">
                <xsl_default:apply-templates select="Announcements" />
            </xsl_default:template>
            - <xsl_default:template match="Announcements">
                - <html>
                    - <head>
                        <title />
                    </head>
                    - <body>
                        - <table cellpadding="0" cellspacing="0" border="0">
                            - <tr>
                                - <td>
                                    <img
                                        Src="http://www.centerpost.com/images/home/cplogo_big2.g
                                </td>
                            </tr>
                        </table>
                        <br />
                        - <font face="arial, helvetica" size="5" color="red">
```

FIG. 7B-8

```
                    <b>"Welcome to centerpost!</b>
                  </fon>
                  <br />
                  <br />
                - <font face="arial, helvetica">
                    Congratulations, you've just received your first
                    smart message.
                    <br />
                    This test message was sent to all of your
                    endpoints
                    <br />
                    <br />
                    You can start sending your own SmartMessages,
                    and learn more
                    <br />
                    about your account at the
                    <a
                      href="http://www.centerpost.com/postm/pmsg1.asp">Centerpost
                      web page</a>
                    <br />
                  </font>
                </body>
              </html>
            <xsl_default:template>
          <xsl_default:stylesheet>
        </event-xsl-endpoint>
      - <event-xsl-endpoint endpoint-type="browser">
        - <xsl_default:stylesheet xmlns="http://www.w3.org/TR/REC-html40"
            xmlns:xsl_default="http://www.w3.org/TR/WD-xsl">
          - <xsl_default:template match="/">
              <xsl_default:apply-templates select="Announcements" />
            </xsl_default:template>
          - <xsl_default:template match="Announcements">
            - <html>
              - <head>
                  <title />
                </head>
              - <body>
                - <table cellpadding="0" cellspacing="0" border="0">
                  - <tr>
                    - <td>
                        <img
                          src="http://www.centerpost.com/images/home/cplogo_big2.gif"
                      </td>
                    </tr>
                  </table>
                  <br />
                - <font face="arial, helvetica" size="5" color="red">
                    <b<"Welcome ton centerpost!</b>
                  </font>
                  <br />
                  <br />
                - <font face="arial, helvetica">
```

FIG. 7B-9

```
                    Congratulations, you've just received your first
                    smart message.
                     <br />
                     This test message was sent to all of your
                     endpoints
                    <br />
                    <br />
                    You can start sending your own SmartMessages,
                    and learn more
                    <br />
                    about your account at the
                    <a
                       href="http://www.centerpost.com/postm/pmsg1.asp">Centerpost
                       web page</a>
                    <br />
                 </font>
               </body>
             </html>
         </xsl_default:template>
        </xsl_default:stylesheet>
      </event-xsl-endpoint>
     </event-class>
    </activity-class>
</smSmartMessageStylesheet>
```

FIG. 7B-10

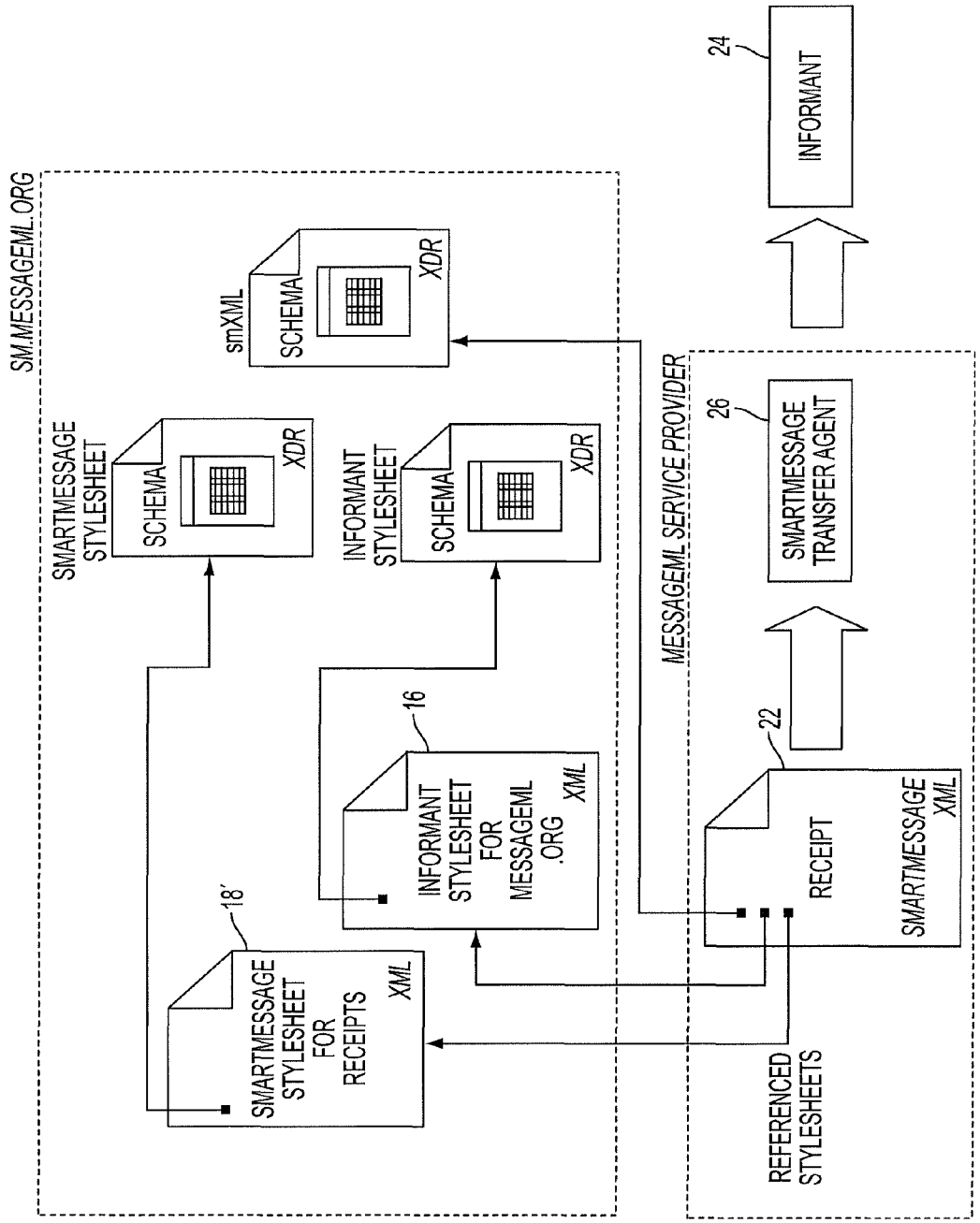

Receipt SmartMessage Stylesheet

```
<smSmartMessageStylesheet
    xmlns= "x - schema : http ://sm.smartmessage.org/schemas/stylesheets/smartmessage/v1-1.xdr"
    smartmessage-stylesheet-class="http://sm.smartmessage.org/stylesheets/receipts/"
    smartmessage-stylesheet-version="v1-0 .xml">

<activity-class
        activity-name="Receipts"
        activity-duration="ongoing"
        event-frequency="once">

<activity-xsl-default>
            <xsl_default : stylesheet xmlns="http://www.w3.org/TR/REC-html 40"
                    xmlns : xsl_default="http://www.w3.org/TR/WD-xsl">
                <xsl_default : template match= "/"/>
            < /xsl_default : stylesheet>
        < / activity-xsl-default>

<event-class
            event-name="DeliveryStatus"
            purpose="information"
            sensitivity="normal"
            reach="individual"
            immediacy="days"
            frequency="daily"
            category="system">

<event-payload-schema>
                <Schema name="deliverystatusreceipt.xdr"
                    xmlns="urn : schemas-microsoft-com: xml-data"
                    xmlns : dt ="urn : schemas-microsoft-com:datatypes">
                    <ElementType name="receipt" content="eltOnly" order="seq">
                        <AttributeType name="receipt-event" dt : type="enumeration"
                                dt : values="delivery-status" default="delivery-status"/>
                        <AttributeType name="receipt-type" dt : type="enumeration"
                                dt : values="ack nak retry" default="nak"/>
                        <AttributeType name="receipt-date" dt : type="dateTime"
                                required="yes"/>
                        <AttributeType name="smartmessage-id" dt : type="string"
                                required="yes"/>
                        <AttributeType name="to-address" dt : type="string" required="yes"/>
                        <AttributeType name="endpoint-type" dt : type="enumeration"
                                dt : values="browser html-email text-email tiny-email fax
                                voice-phone instant-message" required="yes"/>
```

FROM FIG. 9A-1

```
<AttributeType name="endpoint-address" dt : type="string"
        required="yes"/>
<AttributeType name="last-attempt-date" dt : type="dateTime"
        required="yes"/>
<AttributeType name="will-retry-attempt" dt : type="int"
        required="yes"/>
<AttributeType name="will-retry-until" dt : type="dateTime"
        required="yes"/>
<AttributeType name="next-retry-attempt" dt : type="dateTime"
        required="yes"/>
<attribute type="receipt-event"/>
<attribute type="receipt-type"/>
<attribute type="receipt-date"/>
<attribute type="smartmessage-id"/>
<attribute type="to-address"/>
<attribute type="endpoint-type"/>
<attribute type="endpoint-address"/>
<attribute type="last-attempt-date"/>
<attribute type="will-retry-attempt"/>
<attribute type="will-retry-until"/>
<attribute type="next-retry-attempt"/>
<element type="error-info" minOccurs= "0" maxOccurs= "1"/>
<element type="extended-info" minOccurs= "0" maxOccurs= "1"/>
</ElementType>
<ElementType name="error-info" content="eltOnly" order="seq">
```

FIG. 9A-2

```
                <AttributeType name="error-class" dt : type ="enumeration"
                        dt : values="http https smtp smime platform-specific"
                        default="smtp" required="yes"/>
                <AttributeType name="error-code" dt : type="string" required="yes"/>
                <AttributeType name="error-description" dt : type="string"
                        required="yes"/>
                <attribute type="error-class"/>
                <attribute type="error-code"/>
                <attribute type="error-description"/>
            </ElementType>
            <ElementType name="extended-info" content="eltOnly" order="seq"/>
        </Schema>
    </event-payload-schema>
    <even-xsl-default>
        <xsl_default : stylesheet xmlns="http://www.w3.org/TR/REC-html40"
                xmlns : xsl_default="http://www.w3.org/TR/WD-xsl">
            <xsl_default : template match="/">
                <xsl_default : apply-templates select="receipt"/>
            <xsl_default : template>
            <xsl_default : template match ="receipt>
Receipt Item
    receipt-event:          <xsl_default : value-of select="@receipt-event"/>
    receipt-type:           <xsl_default : value-of select="@receipt-type"/>
    receipt-date:           <xsl_default : value-of select="@receipt-date"/>
    smartmessage-id:        <xsl_default : value-of select="@smartmessage-id"/>
    to-address:             <xsl_default : value-of select="@to-address"/>
    endpoint-type:          <xsl_default : value-of select="@endpoint-type"/>
    endpoint-address:       <xsl_default : value-of select="@endpoint-address"/>
    last-attempt-date:      <xsl_default : value-of select="@last-attempt-date"/>
    will-retry-attempt:     <xsl_default : value-of select="@will-retry-attempt"/>
    will-retry-until:       <xsl_default : value-of select="@will-retry-until"/>
    next-retry-attempt:     <xsl_default : value-of select="@next-retry-attempt"/>
    error-class:            <xsl_default : value-of select="error-info/@error-class"/>
    error-code:             <xsl_default : value-of select="error-info/@error-code"/>
    error-description:      <xsl_default : value-of select="error-info/@error-description"/>

Receipt Specific Data:
    <xsl_default : value-of select="extended-info"/>
            </xsl_default : template>
        </xsl_default : stylesheet>
    </event-xsl-default>
</event-class>
```

FROM FIG. 9B-1

```
<event-class
    event-name="Received"
    purpose="information"
    sensitivity="normal"
    reach="individual"
    immediacy="days"
    frequency="once"
    category="miscellaneous">

<event-payload-schema>
        <Schema name="receivedreceipt.xdr"
            xmlns="urn : schemas-microsoft-com : xml-data"
            xmlns : dt="urn : schemas-microsoft-com : datatypes">
            <ElementType name="receipt" content="eltOnly" order="seq">
                <AttributeType name="receipt-event" dt : type="enumeration"
                    dt : values="received" default="received"/>
                <AttributeType name="receipt-type" dt : type="enumeration"
                    dt : values="ack nak" default="nak"/>
                <AttributeType name="receipt-date" dt : type="dateTime"
                    required="yes"/>
                <AttributeType name="smartmessage-id" dt : type="string"
                    required="yes"/>
                <AttributeType name="to-address" dt : type="string" required="yes"/>
                <AttributeType name="error-code" dt : type="string" required="no"/>
                <AttributeType name="error-description" dt : type="string"
                    required="no"/>
                <attribute type="receipt-event"/>
                <attribute type="receipt-type"/>
```

FIG. 9B-2

```
            <attribute type="receipt-date"/>
            <attribute type="smartmessage-id"/>
            <attribute type="to-address"/>
            <element type="error-info" minOccurs="0" maxOccurs="1"/>
            <element type="extended-info" minOccurs="0" maxOccurs="1"/>
        </ElementType>
        <ElementType name="error-info" content="eltOnly" order="seq">
            <AttributeType name="error-class" dt : type= "enumeration"
                    dt : values="http https smtp smime platform-specific"
                    default="smtp" required="yes"/>
            <AttributeType name="error-code" dt : type= "string" required="yes"/>
            <AttributeType name="error-description" dt : type= "string"
                    required="yes"/>
            <attribute type="error-class"/>
            <attribute type="error-code"/>
            <attribute type="error-description"/>
        </ElementType>
        <ElementType name="extended-info" content="eltOnly" order="seq"/>
    </Schema>
</event-payload-schema>
<event-xsl-default>
    <xsl_default : stylesheet xmlns="http://www.w3.org/TR/REC-html40"
        xmlns : xsl_default="http://www.w3.org/TR/WD-xsl">
        <xsl_default : template match="/">
            <xsl_default : apply-templates select="receipt"/>
        <xsl_default : template>
        <xsl_default : template match="receipt">
Receipt Item
    receipt-event:          <xsl_default : value-of select="@receipt-event"/>
    receipt-type:           <xsl_default : value-of select="@receipt-type"/>
    receipt-date:           <xsl_default : value-of select="@receipt-date"/>
    smartmessage-id:        <xsl_default : value-of select="@smartmessage-id"/>
    to-address:             <xsl_default : value-of select="@to-address"/>
    error-class:            <xsl_default : value-of select="error-info/@error-class"/>
    error-code:             <xsl_default : value-of select="error-info/@error-code"/>
    error-description:      <xsl_default : value-of select="error-info/@error-description"/>

Receipt Specific Data:
    <xsl_default : value-of select="extended-info"/>
            </xsl_default : template>
        </xsl_default : stylesheet>
    </event-xsl-default>
</event-class>
```

FROM FIG. 9C-1

```
<event-class
    event-name="Processed"
    purpose="information"
    sensitivity="normal"
    reach="individual"
    immediacy="days"
    frequency="once"
    category="miscellaneous">

<event-payload-schema>
        <Schema name="processedreceipt.xdr"
            xmlns="urn : schemas-microsoft-com : xml-data"
            xmlns : dt="urn : schemas-microsoft-com : datatypes">
            <ElementType name="receipt" content="eltOnly" order="seq">
                <AttributeType name="receipt-event" dt : type="enumeration"
                    dt : values="processed" default="processed"/>
                <AttributeType name="receipt-type" dt : type="enumeration"
                    dt : values="ack nak" default="nak"/>
                <AttributeType name="receipt-date" dt : type="dateTime"
                    required="yes"/>
                <AttributeType name="smartmessage-id" dt : type="string"
                    required="yes"/>
                <AttributeType name="to-address" dt : type="string" required="yes"/>
                <AttributeType name="error-code" dt : type="string" required="no"/>
                <AttributeType name="error-description" dt : type="string"
                    required="no"/>
                <attribute type="receipt-event"/>
```

FIG. 9C-2

```xml
            <attribute type="receipt-type"/>
            <attribute type="receipt-date"/>
            <attribute type="smartmessage-id"/>
            <attribute type="to-address"/>
            <element type="error-info" minOccurs="0" maxOccurs="1"/>
            <element type="extended-info" minOccurs="0" maxOccurs="1"/>
        </ElementType>
        <ElementType name="error-info" content="eltOnly" order="seq">
            <AttributeType name="error-class" dt : type= "enumeration"
                    dt : values="http https smtp smime platform-specific"
                    default="smtp" required="yes"/>
            <AttributeType name="error-code" dt : type= "string" required="yes"/>
            <AttributeType name="error-description" dt : type= "string"
                    required="yes"/>
            <attribute type="error-class"/>
            <attribute type="error-code"/>
            <attribute type="error-description"/>
        </ElementType>
        <ElementType name="extended-info" content="eltOnly" order="seq"/>
    </Schema>
</event-payload-schema>
<event-xsl-default>
    <xsl_default : stylesheet xmlns="http://www.w3.org/TR/REC-html40"
            xmlns : xsl_default="http://www.w3.org/TR/WD-xsl">
        <xsl_default : template match="/">
            <xsl_default : apply-templates select="receipt"/>
        <xsl_default : template>
        <xsl_default : template match="receipt">
```
Receipt Item
   receipt-event:      `<xsl_default : value-of select="@receipt-event"/>`
   receipt-type:      `<xsl_default : value-of select="@receipt-type"/>`
   receipt-date:      `<xsl_default : value-of select="@receipt-date"/>`
   smartmessage-id:   `<xsl_default : value-of select="@smartmessage-id"/>`
   to-address:       `<xsl_default : value-of select="@to-address"/>`
   error-class:      `<xsl_default : value-of select="error-info/@error-class"/>`
   error-code:       `<xsl_default : value-of select="error-info/@error-code"/>`
   error-description: `<xsl_default : value-of select="error-info/@error-description"/>`

Receipt Specific Data:
```xml
        <xsl_default : value-of select="extended-info"/>
        </xsl_default : template>
    </xsl_default : stylesheet>
</event-xsl-default>
</event-class>
</activity-class>
</smSmartMessageStylesheet>
```

© 2000 Centerpost Corp.

FIG. 9D

ENDPOINTS

All Endpoints (Add New Endpoints)

| Nickname | Type | Description | Message Delivery | | | |
|---|---|---|---|---|---|---|
| Fax | Fax | My fax machine | Normal | All | Off | [details] [test] |
| Pager | Text Pager / Phone | My pager/cell phone text endpoint | Normal | All | Off | [details] [test] |
| WorkEmail | Email (HTML) | My email endpoint | Normal | All | Off | [details] [test] |
| WorkPhone | Voice Phone | My voice phone endpoint | Normal | All | Off | [details] [test] |

HOME | PRESS | JOBS | PRIVACY | LEGAL
Copyright 2000 | Centerpost Corporation

FIG. 10A

INDIVIDUAL XML MESSAGE PROCESSING PLATFORM

This non-provisional application is a continuation of patent application Ser. No. 11/432,896, entitled INDIVIDUAL XML MESSAGE PROCESSING PLATFORM, filed on May 12, 2006, which is a divisional of patent application Ser. No. 09/661,499, entitled CONSUMER XML MESSAGE PROCESSING PLATFORM, filed on Sep. 14, 2000, now issued U.S. Pat. No. 7,062,535, which is a non-provisional of provisional patent application Ser. No. 60/194,254, entitled Consumer XML Message Processing Platform, filed on Apr. 3, 2000.

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention pertains to a communications platform, and more specifically the present invention pertains to a message processing platform that enables individuals to receive, store, synthesize and intelligently process XML-based electronic messages and standard SMTP email from corporations or any other senders in a way that fully integrates individuals' existing email boxes, cell phones, pagers, fax machines, telephones, and other devices.

Despite the limitations of existing technologies, the electronic communications market is enormous and growing very rapidly. There are over 260 million email boxes worldwide and 9.2 billion messages sent daily in the United States alone. Mobile data appliances are likewise growing rapidly with over 208 million digital wireless phone subscribers worldwide today. Similarly, Internet appliances are expected to explode to 55 million connected devices by 2002. As shown in FIG. 1, there exists a need for a new communications platform capable of fully integrating individuals' existing email boxes, cell phones, pagers, fax machines, telephones, and other devices, to take full advantage of these exploding markets.

A novel communications platform is needed by businesses and consumers due to 1) inherent limitations of email, 2) lack of integration between consumer "endpoints" (email addresses, wireless devices, fax machines, etc.) and 3) exploding electronic communications complexity.

First, email is not a suitable medium for corporations to interact with their customers in anything but a "newsletter" fashion. Email does not, by definition, contain anything more intelligent than a sender's address, an urgent/non-urgent tag, a subject line, and a text body. Email, by definition, typically goes into a user's single inbox where it is opened, read, and stored or deleted. Once more and more corporations send their customers email messages, the receiver quickly has a problem with inbox overload. Email also cannot be relied upon for urgent messages or alerts since users check email with varying frequency. Further, email cannot be easily automatically sorted, synthesized, filed, re-formatted or summarized. Today, in order to automatically file or process incoming email, a user has to manually setup message-specific rules such as a search of the subject line or specify an action based on a specific sender's address. As corporations and individuals send increasing volumes of text messages a more intelligent way to process, store, and synthesize these messages is needed. It will not be convenient, for example, to open every message from a person's credit card vendor to see that payments have been posted, transactions have been processed, or bills have been mailed. These messages should be intelligently stored so that the consumer can view a synthesized status or see detail if desired.

Second, many individuals use a variety of electronic communication addresses for their email boxes, wireless phones, pagers, fax machines, instant messaging, etc. There is no way to effectively integrate those devices: pagers, email boxes, telephones and fax machines are ignorant of each other. There are webmail and email solutions that will forward email messages to pagers or cell phones or convert email text to a fax message or a voice message. None of these solutions intelligently determine the correct destination of each specific incoming message without the user's manual control or message-specific rules being setup beforehand. Existing services, for example, will not automatically understand that a flight cancellation alert should go to any device a receiver has that is likely to deliver the message immediately but a special fares notice from the same airline should go to a lower immediacy, less intrusive device. Many unified messaging solutions force users to give up existing addresses and phone numbers and do not process intelligent incoming messages. These platforms only enable to receiver to convert and listen to messages from a variety of platforms. While some will find a subscriber by trying multiple phone numbers, there is no real intelligent routing based on the content of the incoming message since the incoming message is generally a voicemail or an email.

Third, communications complexity is exploding for corporations and individuals. New "connected" devices are being introduced every day—each with different capabilities, formatting, protocol requirements, and addresses. Individuals have new choices in the types of information they can receive and the devices upon which that information can be received and viewed. Existing message connections between individuals and/or corporations are typically point-to-point. If a corporation wants to send a message to a customer's pager, that corporation sends a message directly to that pager's address. Likewise if an individual wants to send a text message to a friend's specific endpoint, that person in many cases has to know and remember multiple email addresses, a PCS wireless phone text address, a fax number, a pager number, etc. If the receiving individual ever changes pagers or wireless phone providers, that individual has to remember to provide all possible sending parties with the new device-specific address.

As wireless PDAs, cars, home appliances, and other devices all begin to have their own electronic messaging address, the existing point-to-point, address-specific messaging approach will become extremely burdensome and complex for senders and receivers. This problem is exacerbated by the need to limit access to a specific individual's communications world but enable access for friends and family without having to share passwords. FIG. 2 shows these above-listed limitations on the current state of electronic messaging.

SUMMARY OF THE INVENTION

The present invention is a type of communications platform also known generally as a "MessageML Processing Platform", of which the "Centerpost Platform" is one example of this type of platform. This novel communications platform enables individuals to receive, store, synthesize, format and intelligently process XML-based electronic messages and standard SMTP email from corporations or any other senders in a way that fully integrates individuals' existing email boxes, cell phones, pagers, fax machines, telephones, and other devices. This novel communications platform reduces complexity, lowers costs, and increases capabilities for corporations that interact electronically with their customers. The communications platform also enables many valuable notification applications for corporations such as airlines, brokerages, financial institutions, and retailers, among others. For individuals, the present invention delivers valuable information while simplifying the management of all electronic communications. The invention is needed due to inherent limitations of email, lack of integration between individual "endpoints" (email addresses, wireless devices, fax machines, etc.) and exploding electronic communications complexity.

The present invention enables corporations and third parties to define and create applications using a common, centralized platform. The invention can be used 1) by individuals via a web-mail like offering, 2) by telecommunications and internet service providers on a hosted or licensed basis, 3) by corporations on a hosted or licensed basis, or 4) by other service providers on a hosted or licensed basis.

FIG. 3A shows a schematic view of the present invention as applied to electronic messaging between corporations and individuals. This novel platform is also intended to function between corporations, and between individuals, and is not merely limited to communications between corporations and individuals. FIG. 3B shows some examples of the flow of communication using such a centralized, user-centric hub. FIG. 3C lists some of the example interactions using the Centerpost platform.

DETAILED DESCRIPTION OF THE FIGURES

FIGS. 3A through 3C are block diagrams and charts displaying and indicating electronic messaging with the novel communications platform, along with examples of interactions available due to the platform;

FIG. 5 is an example of code for a SmartMessage of the present invention;

FIGS. 7A and 7B-1-7B-10 are examples of code for an Informant Stylesheet and a SmartMessage Stylesheet of the present invention;

FIG. 8 is a block diagram illustrating the interrelationship between the elements of the SmartMessage of the present invention, including the receipt function;

FIG. 9A-9D are examples of code for a receipt SmartMessage Stylesheet of the present invention;

FIGS. 10A through 10F shows examples of website pages containing endpoint setup and management information in accordance with the present invention;

DETAILED DESCRIPTION OF THE INVENTION

Figure 1:
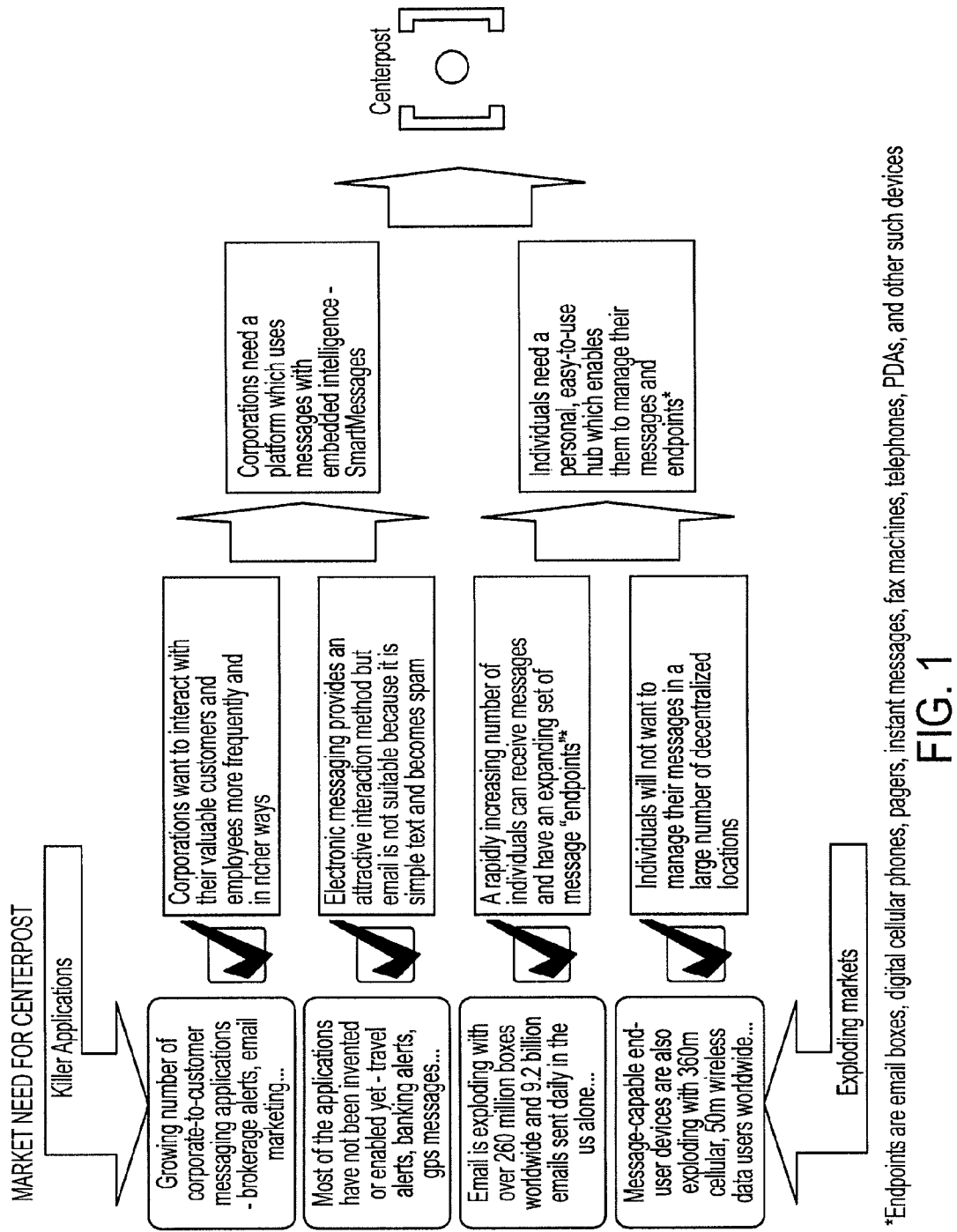
FIG. 1 is a block diagram detailing the need for a novel communications platform capable of utilizing intelligent messages and integrating endpoints.
Figure 2:
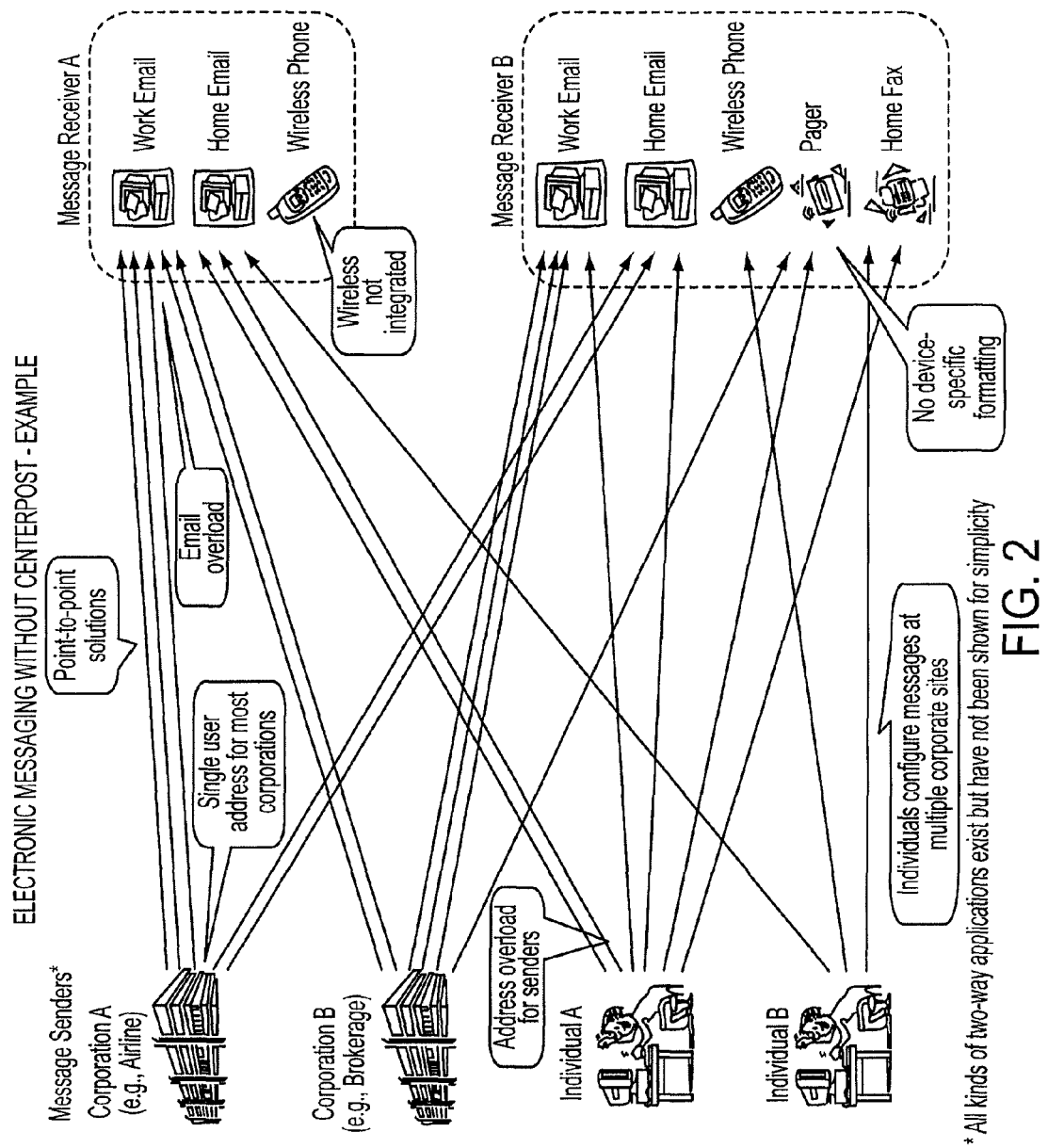
FIG. 2 is a schematic diagram displaying electronic messaging without the novel communications platform.

The novel communications platform contains specific components to the invention that enable a complete solution to the inherent limitations found in current communication platforms. These components include the capability for individuals to receive raw XML electronic messages (including those sent from particular corporations); a novel XML message format and structure called "MessageML" which enables corporations and others to create their own message formats, which can be processed by the new communications platform; an intelligent processing, storage, conversion, and routing engine in a scalable architecture that is aware of each individual's communications environment; "nickname-based routing" to enable device-specific sending without the specific device address; information "folios" which enable synthesized viewing and storage of all received electronic messages composed in MessageML format (also known as "SmartMessages"), and which are organized into sender definable "activities" and "events;" and a web-based user-configured interface to enable simple viewing, control, and configuration. The novel communications platform also allows access to its user-configured interface from other communications channels in addition to the Internet, such as through a mobile phone using a WAP browser or voice recognition.

The novel communications platform, through its SmartDelivery system, allows for corporations to utilize the functions inherent in the platform for its own customers, without requiring those customers to have their own platform or a MessageML account. The novel communications platform also provides a service whereby knowledgeable individuals, or Amateur Informants, facilitate the use of the platform for individuals and small businesses by allowing these individuals or small businesses to utilize the functions of the novel platform without the need to learn to use XML coding. The platform also provides for 2-way XML messages, whereby the recipient of a SmartMessage can automatically respond regardless of the endpoint that the message is received on and the response will be delivered back to the sender in XML format.

The novel communications platform also provides for a platform subscriber web page whereby designated personal information of the individual is accessible on a secure basis; an endpoint wallet, which allows subscribers to easily transfer their endpoint information to other web pages and the like; and a message based endpoint configuration, in which a SmartMessage from a communication device automatically sets up that device as an endpoint in the user's SmartDelivery or SmartMessage account.

Similar to electronic mail, XML electronic messages can currently be sent over existing Internet and SMTP transport networks. However, currently XML electronic messages can generally only be received by corporate systems in business-to-business communications. The present invention provides the first capability for individuals to receive XML electronic messages or SmartMessages.

Figure 4:
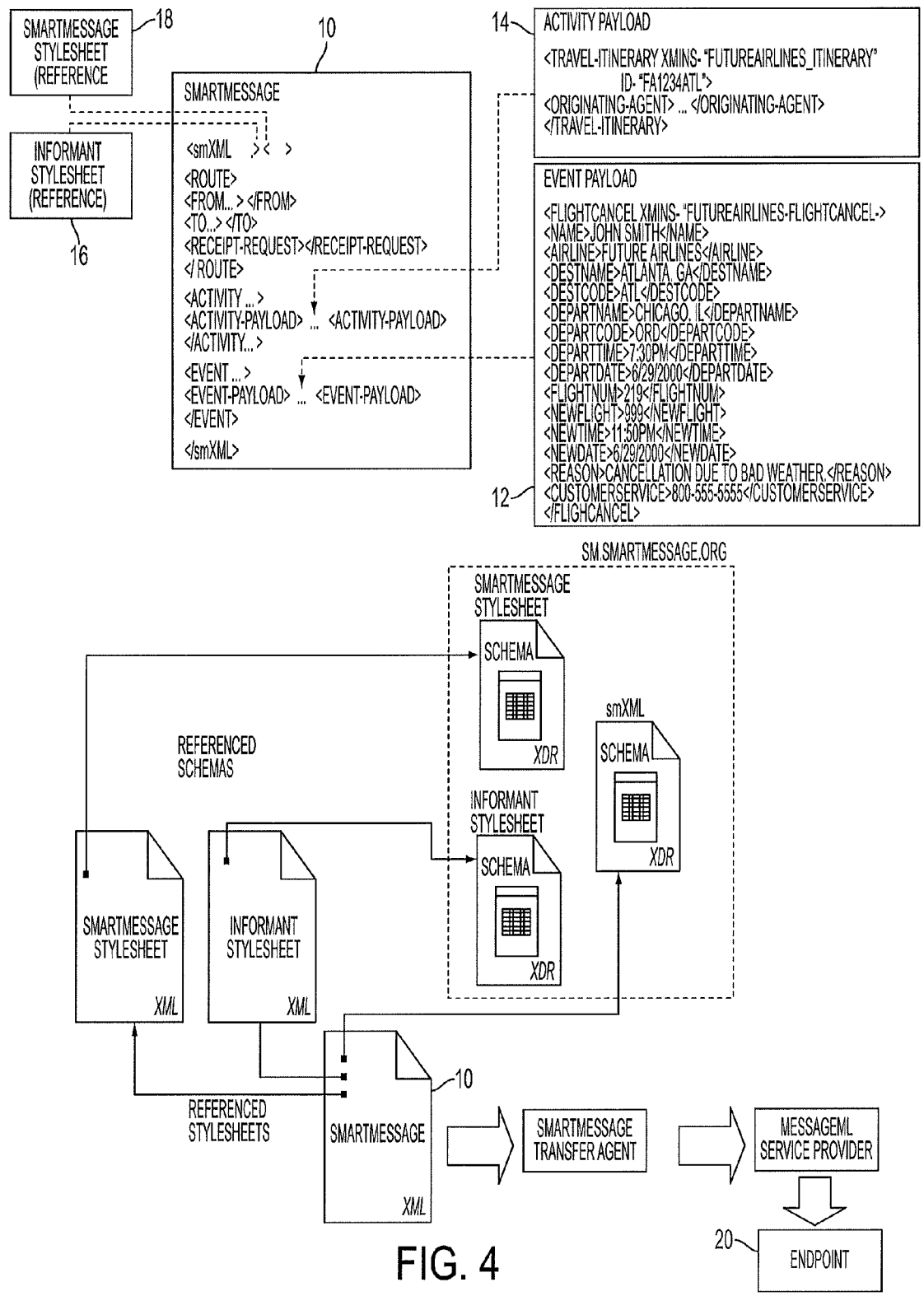
FIG. 4 is a block diagram illustrating the interrelationship between the elements of the SmartMessage of the present invention, and the interrelationship between the SmartMessage, the Stylesheets, and the activity and event payloads of the present invention.
Figure 6:
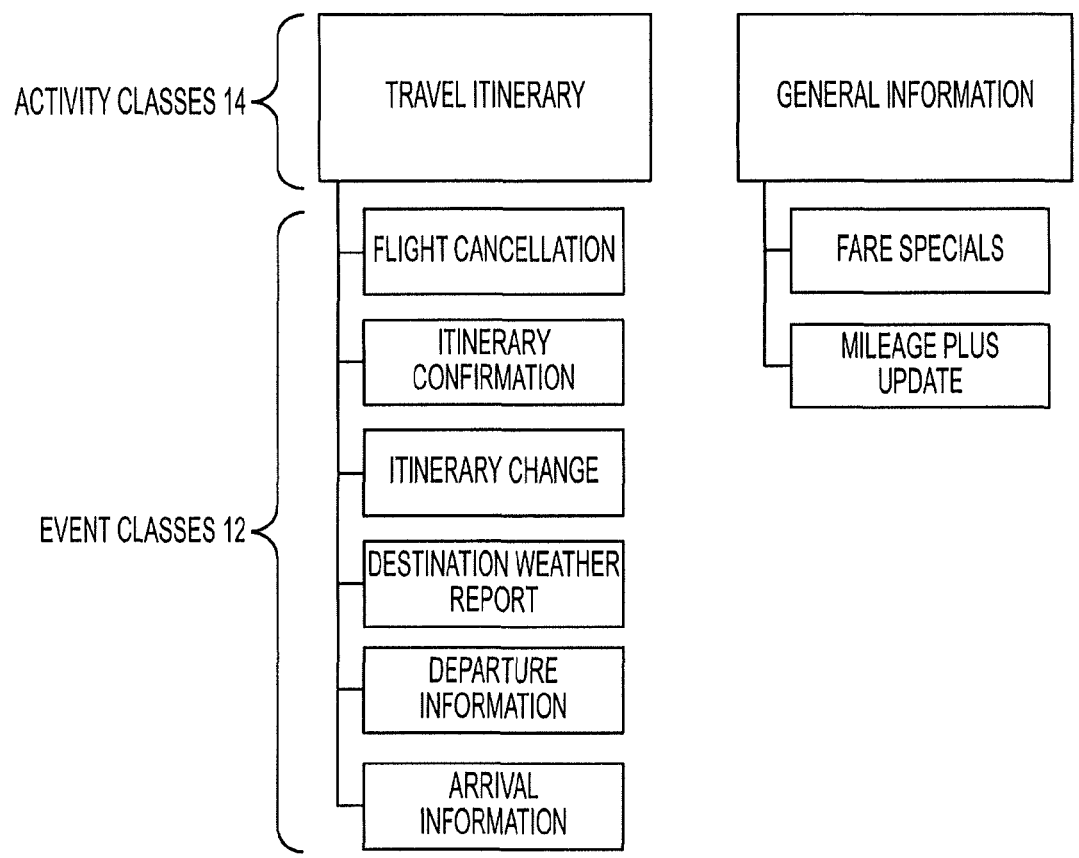
FIG. 6 is a block diagram illustrating the interrelationship between activity classes and event classes of the present invention.

A SmartMessage 10 is an XML document sent by an Informant to a novel communications platform like Centerpost. An Informant is a sender of SmartMessages 10 or MessageML electronic messages. Informants can be corporations, other types of organizations, or individuals. FIG. 4 shows an example of a SmartMessage 10. A SmartMessage 10 carries Event content 12, or "payload", (such as a flight cancellation or a shipment confirmation), and is associated with and updates an Activity 14 (such as a travel itinerary or DVD order). FIG. 6 shows the relationship between the activity classes 14 and event classes 12. In use, a SmartMessage 10 is sent to individual recipients through a MessageML Service Provider such as Centerpost. The SmartMessage 10 and the MessageML system is described in a patent application filed concurrently herewith, entitled Method and System for Content Driven Electronic Messaging, and incorporated herein by reference. FIG. 5 shows the code for a sample SmartMessage.

Meta-data, such as formatting information, is found by referencing the associated Informant stylesheet 16 (which describes the informant) and the associated SmartMessage stylesheet 18 (which describes the activity and event). FIGS. 7A and 7B show examples of an Informant stylesheet 16 and a SmartMessage Stylesheet 18, respectively. An Informant stylesheet 16 describes the meta-data about the Informant, such as its name, website address, industry category, and the like. Another role of the Informant Stylesheet 16 is to provide information about and authenticate the sender of the message. The Informant Stylesheet 16 usually resides on the Informant's web server and is versioned by its filename. A MessageML platform like the novel Centerpost communications platform caches these stylesheets.

The SmartMessage Stylesheet 18 serves three main functions. The SmartMessage Stylesheet 18 defines activity and event class meta data and organization; defines the XML schemas of the activity 14 and event class 12 payloads (content); and defines how the payload is rendered for specific endpoints 20. The SmartMessage stylesheet 18 also informs the platform of the types of messages (or "event classes") that have been created and may be sent by that Informant. The SmartMessage Stylesheet 18 generally resides on one of the Informant's web servers, but Informants can also share a common stylesheet on a shared server.

A MessageML platform like Centerpost caches these stylesheets in its own database so it can refer to them quickly without accessing the Internet. A single SmartMessage Stylesheet XML document can contain meta-data about several SmartMessage activities and events.

The SmartMessage protocol has been developed to create an open, extensible message format used by the MessageML platform. The SmartMessage protocol enables corporations and other senders to create their own message formats that can be processed by the platform.

SmartMessages 10 contain standardized XML-tags that enable the platform to understand the nature of the message and forward, copy, format, convert, store, consolidate, summarize, or stop the communication accordingly. The XML tags describe things like the message immediacy, reach, sensitivity, and purpose. XML SmartMessages 10 are self-describing and self-formatting via stylesheets. In addition, the XML messages are fully extensible by senders to encompass their own fields and definitions. These tags are used by the platform to automatically determine how to display, summarize, and process incoming messages. With XML, the communications platform can more intelligently process, sort, synthesize, format and route messages.

The novel communications platform is a highly scalable and reliable XML messaging engine capable of processing messages based on highly dynamic and openly definable logic. The platform is fully aware of each individual user's entire communications environment, such as email boxes, cell phones, pagers, fax machines, telephones, etc. as well as the devices of spouses, assistants, friends, and co-workers, whom the user may wish to receive a copy of a message depending on its specific content. The communications platform automatically processes based on the pre-defined defaults, the user's preferences regarding his electronic endpoints (email boxes, wireless devices, etc.) and the attributes of the message itself. This embedded intelligence, for example, would send travel weather alerts to the user's home fax but flight cancellations to the user's cellphone with a copy to the assistant's work fax. Users can modify the rules if they prefer to deviate from the systems defaults. With this novel communications platform, individuals only define their endpoints once in a single spot and retain a lifetime electronic address for all of their endpoints.

The communications platform also contains escalation rules that allow further intelligence in message routing and delivery. FIG. 8 shows a high-level perspective of the entities involved in the architecture of the present invention. A receipt 22 can be generated by the communications platform and sent back to the Informant 24 through the SmartMessage Transfer Agent 26. For example, if the receipt 22 of an urgent message is not confirmed by the endpoint 20 designated by the user, the platform can route the message to another endpoint until the receipt of the message by the user is confirmed. This additional intelligence also may incorporate location-based sensing and device-sensing capabilities. For example, the platform may change routing directions based on device-sensing technology that allows the platform to determine whether the device is on or off, or based on location-sensing technology that tells the platform where the device is located. FIG. 9 is an example of the code pertaining to a Receipt SmartMessage Stylesheet.

Figure 10B:
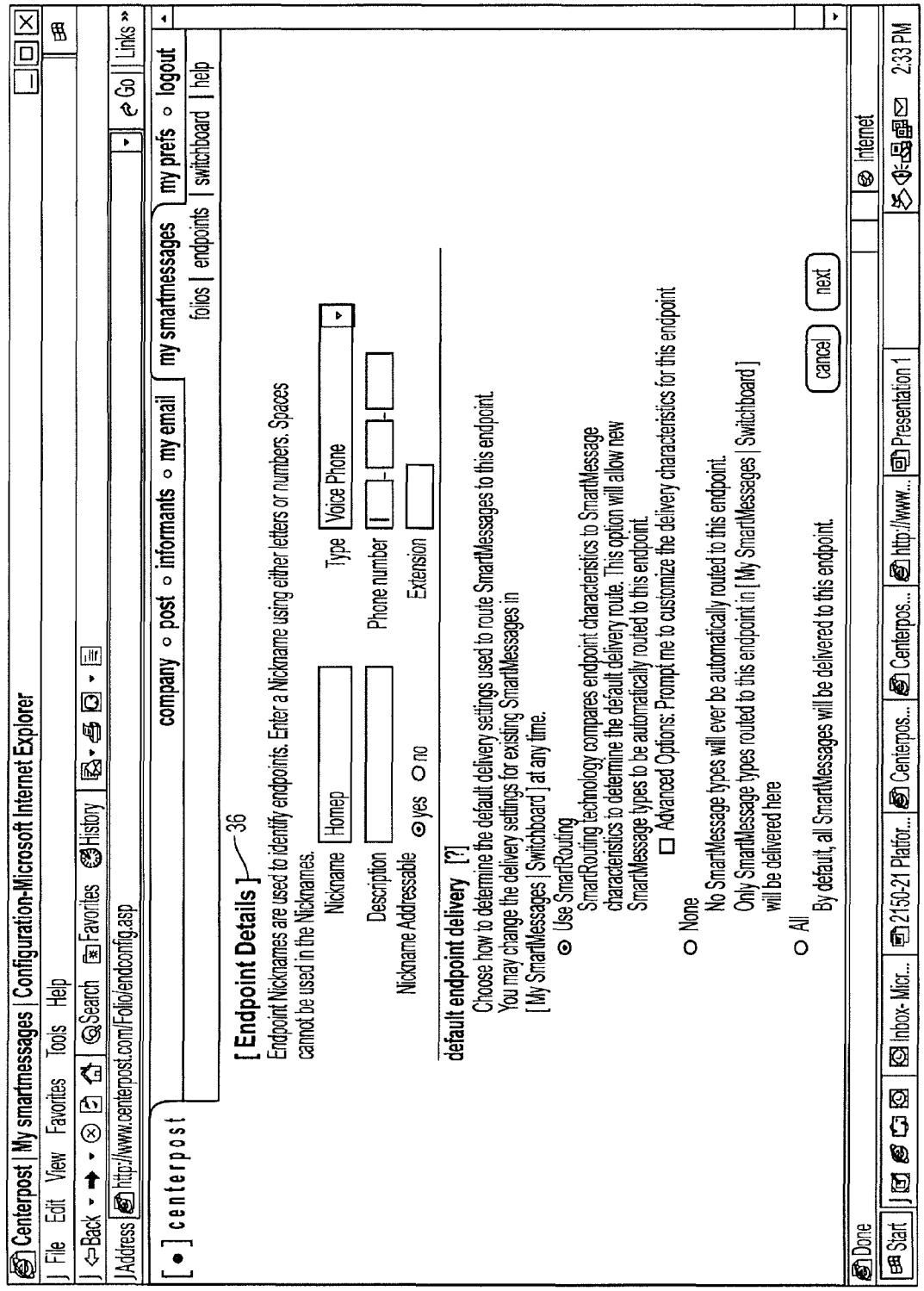

FIGS. 10A through 10F show examples of the display screens for the endpoint setup and management pertaining to the novel communications platform. In order to utilize the novel platform, a subscriber must configure one or all of the endpoints 20 to be used on the platform. Once in the platform's website, the user can enter the endpoints web page to add a particular endpoint 20 to the communications platform. FIG. 10A is a screen print of the endpoint setup page for the Centerpost communications platform. On this web page, each of the subscriber's endpoints 20 is defined, including the type of endpoint 28, any nickname 30 given to that endpoint, a description 32, device settings and options 34. FIG. 10B is an example of a web page that describes the details 36 for a particular endpoint, in this case, the subscriber's HTML Email. The subscriber can modify the details for this endpoint at this page, i.e., route certain SmartMessages to this endpoint, route all SmartMessages to this endpoint, etc.

The platform will allow the user to view and interact with the interface used to control his endpoints, from other communications channels aside from a website, such as from a voice phone using voice recognition or a WAP browser. The user thus will be able to, for example, adjust delivery preferences and folio preferences from his PDA or mobile phone.

Figure 10C:
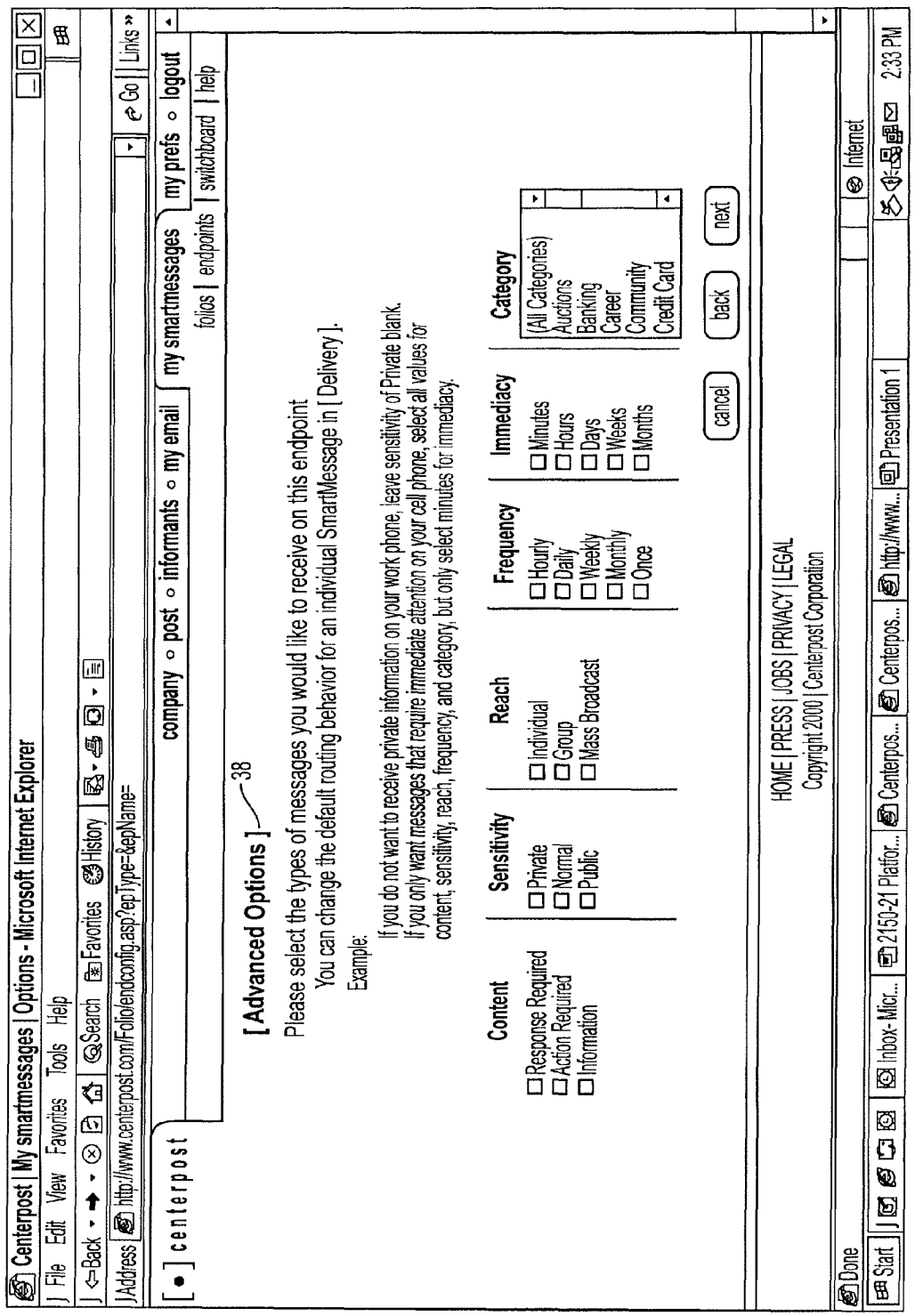

FIG. 10C is an example of a web page that allows the subscriber to modify certain advanced options 38 for a particular endpoint. For example, the types of messages that the user would like to receive at this endpoint, etc.

Figure 10D:
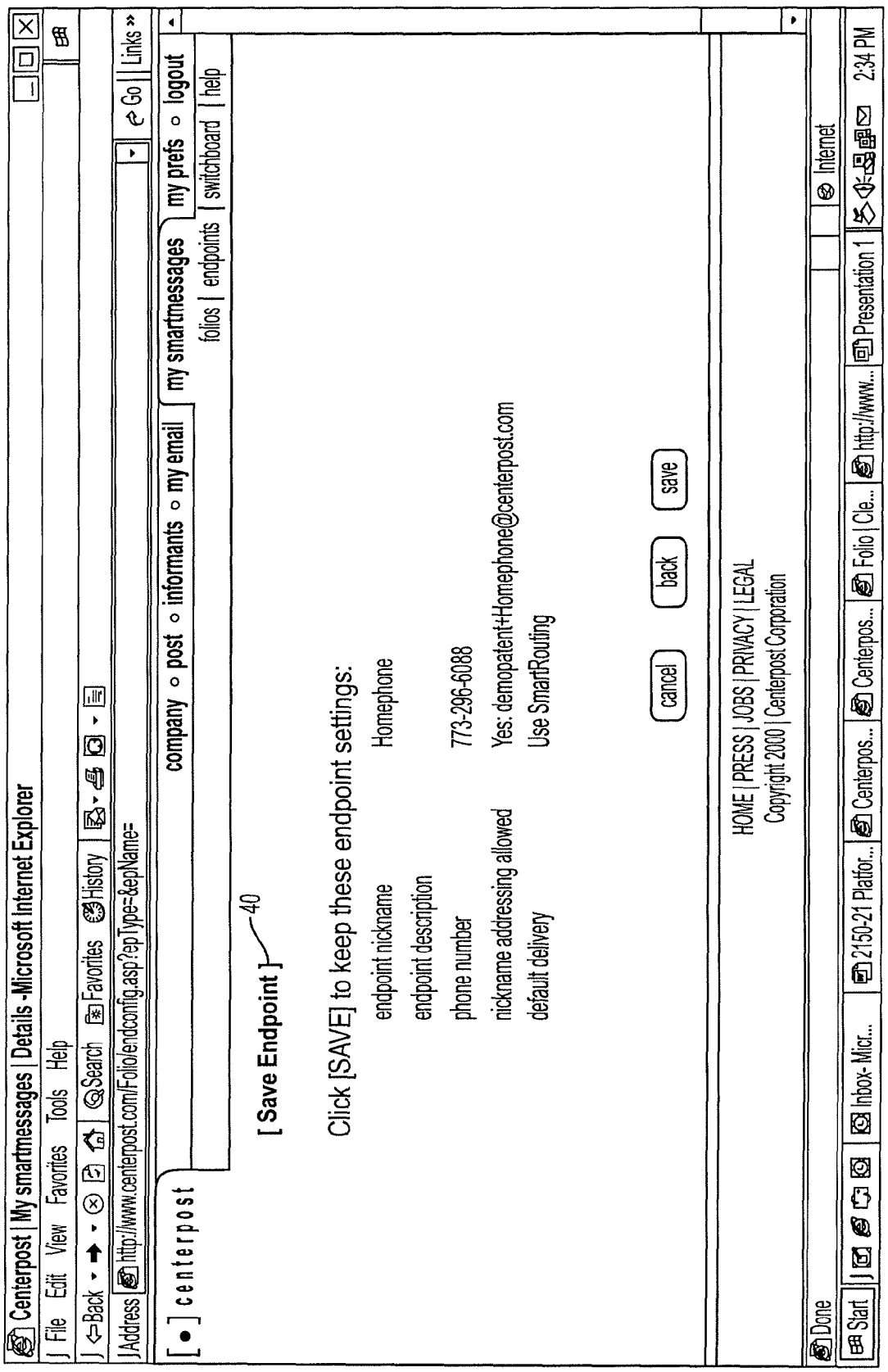
Figure 10E:
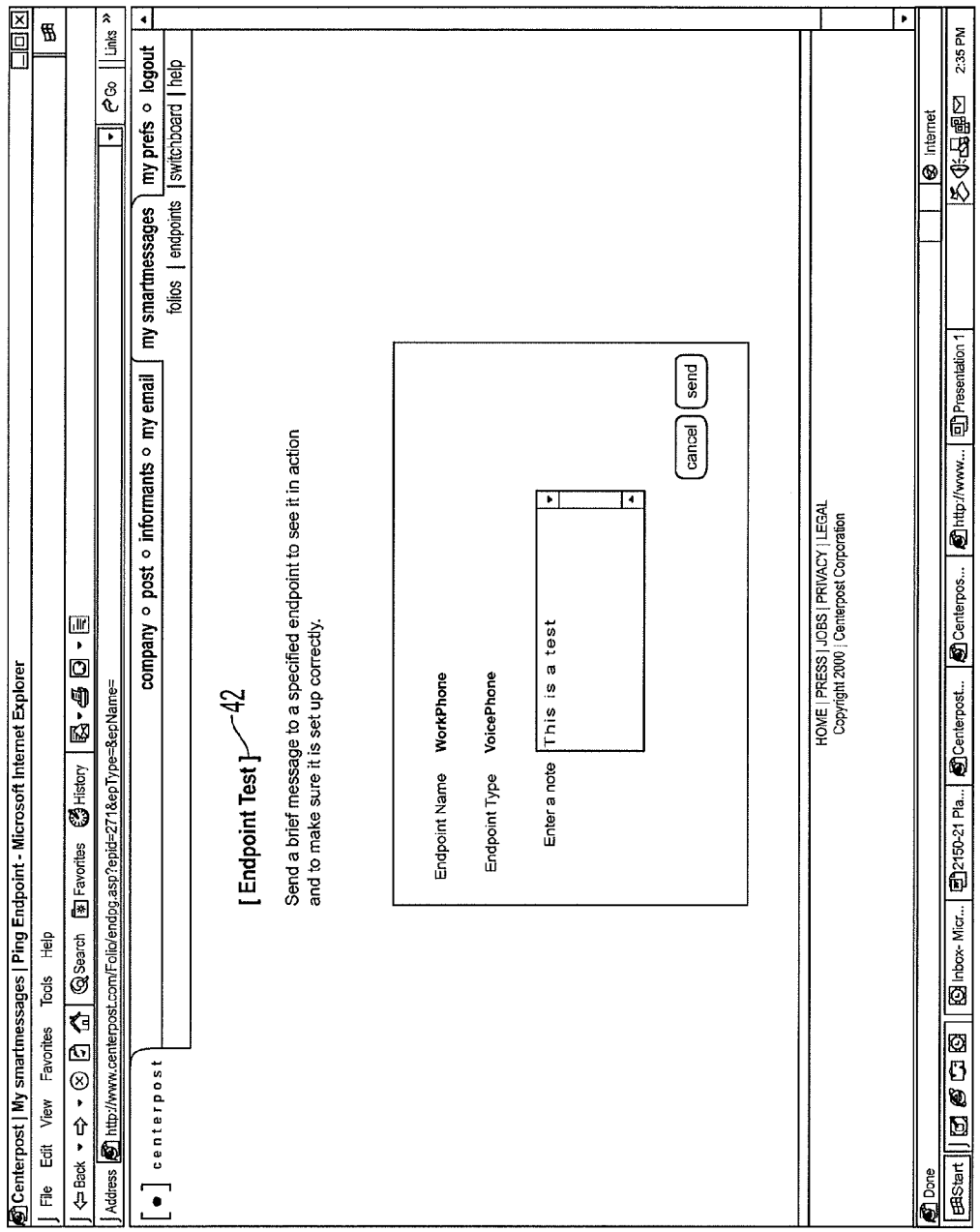
Figure 10F:
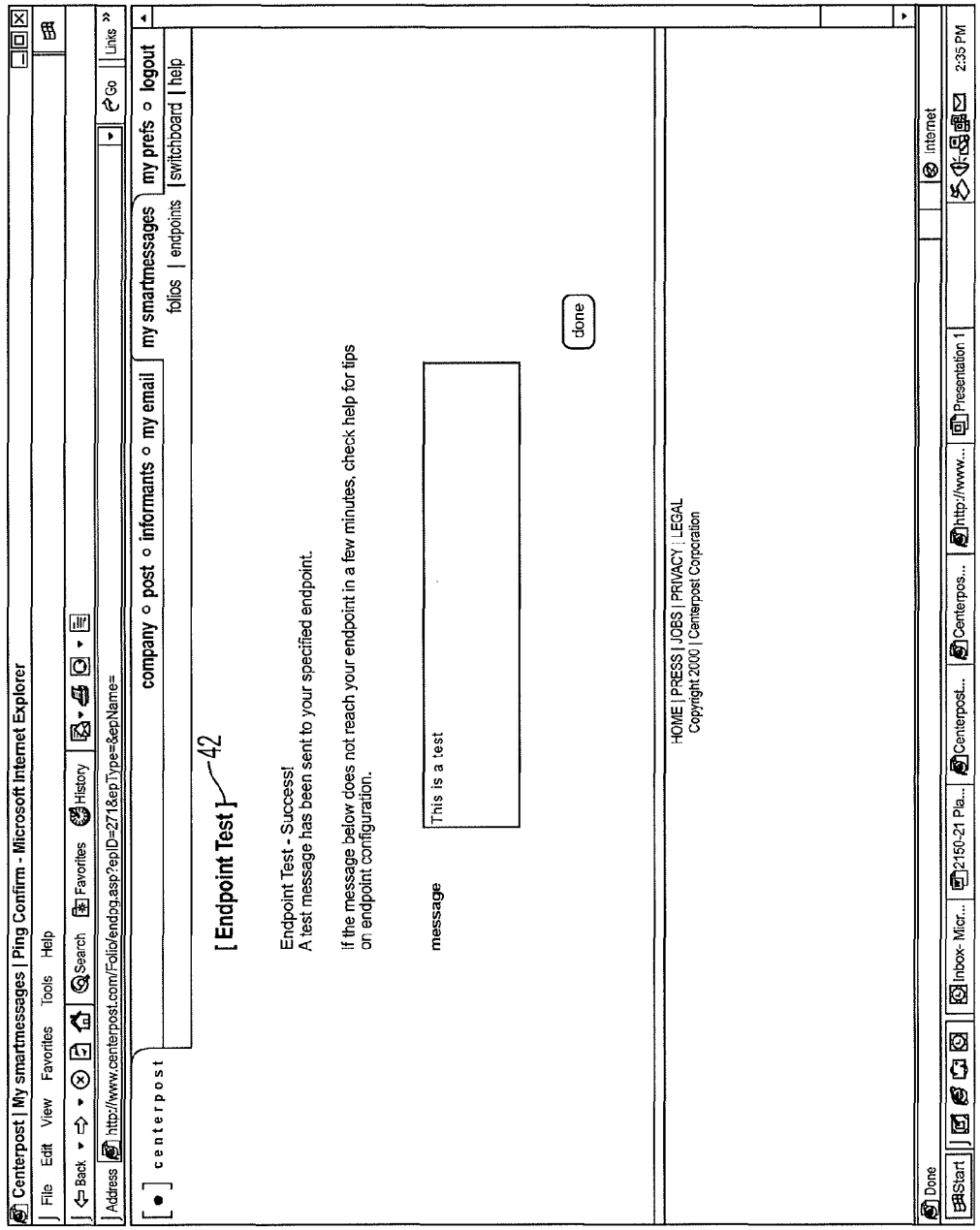

Once all of the information has been entered for a particular endpoint 20, the subscriber enters the Save Endpoint 40 web page as shown in FIG. 10D. This page allows the user to save all of the information previously entered pertaining to that particular endpoint. FIGS. 10E and 10F show the screen prints for the Endpoint Test 42 web pages. The subscriber can use these pages to test his endpoint and the configuration thereof.

Figure 11:
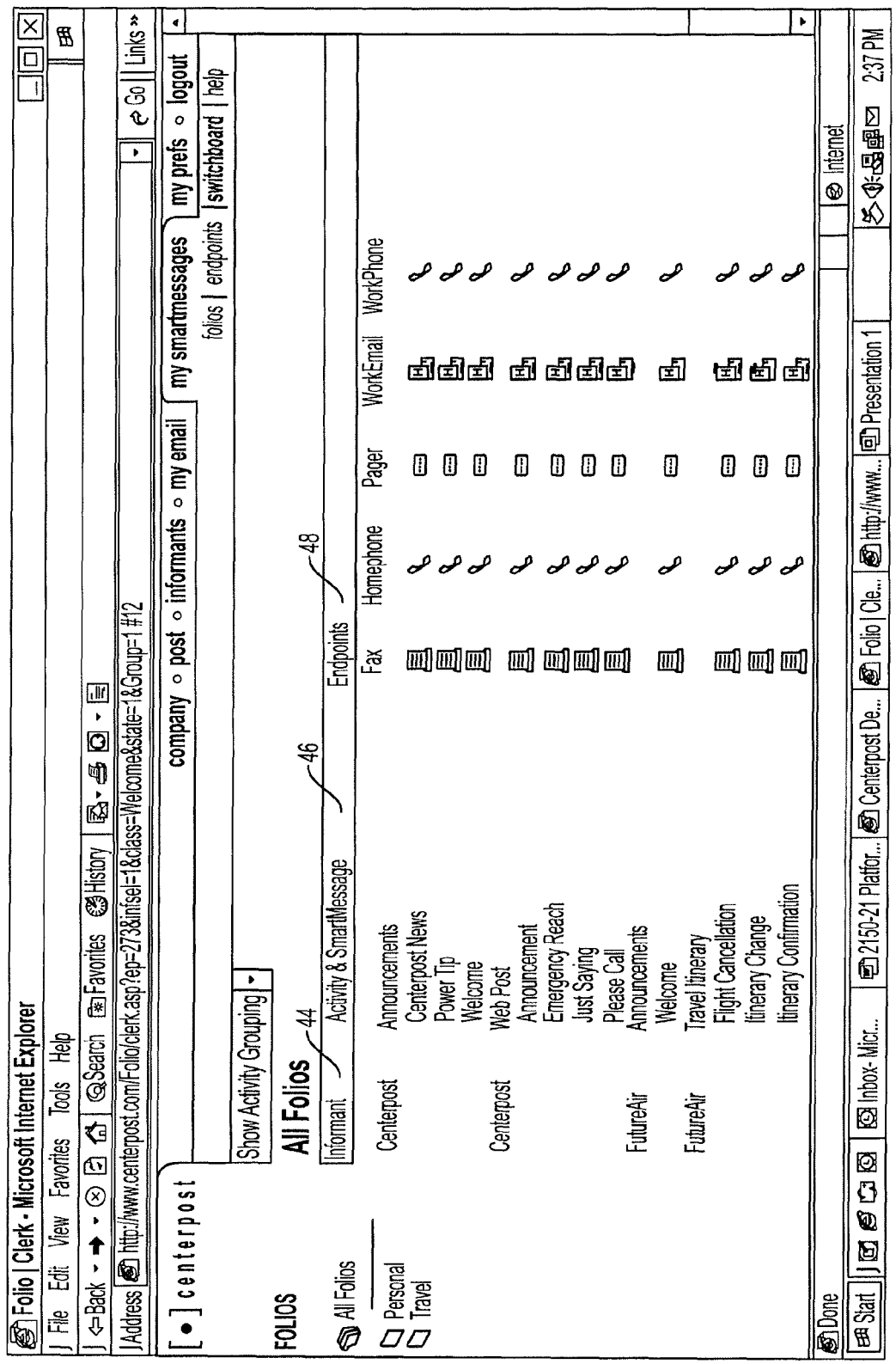
FIG. 11 shows an example of a website page containing delivery information in accordance with the present invention.

FIG. 11 is a screen print of the delivery web page pertaining to the Centerpost communications platform. The delivery page provides historical information to the subscriber, including whether messages were delivered, when they were sent and received, the endpoint they were delivered to, etc. The delivery page example shown in FIG. 11 is for the user's personal delivery information and is divided into three different categories: Informant 44, Activity & SmartMessage 46, and Endpoints 48. However, like all of the other pages described herein, the delivery page could be configured in a multitude of different ways.

Figure 12:
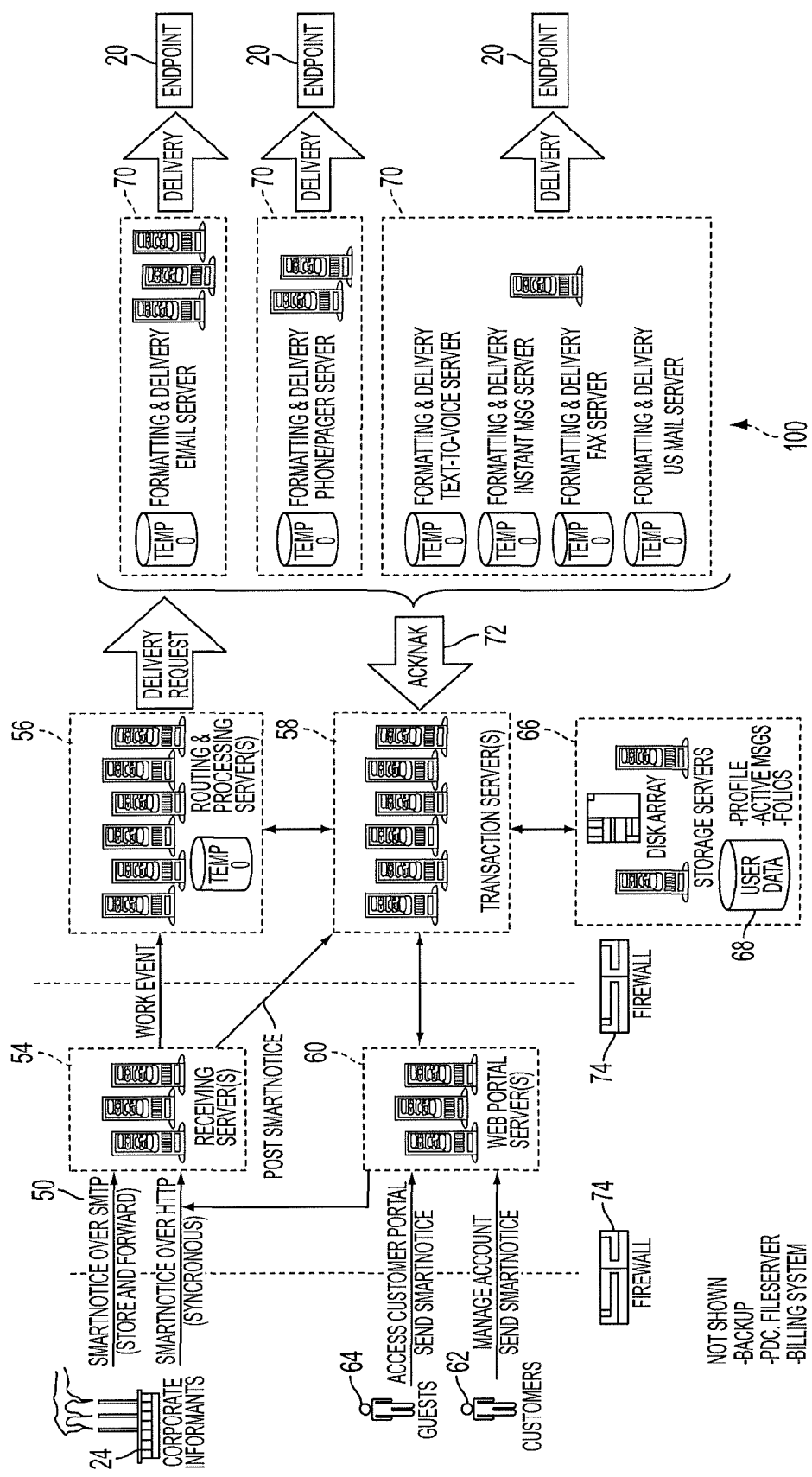
FIG. 12 is a diagram illustrating the architecture of the communications platform of the present invention.

FIG. 12 shows an example of the deployment architecture for the communications platform 100 of the present invention. In this example, a SmartMessage 10 is delivered, either using the Simple Mail Transfer Protocol (SMTP) 50 or the Hypertext Transfer Protocol (HTTP) 52, to a receiving server 54. The message is transmitted to routing and processing servers 56 or transaction servers 58 (or both). Transaction servers 58 interact with web portal servers 60, which are accessible by customers 62 of the system and by particular guests 64. Transaction servers 58 also interact with various storage servers 66 to access user data information 66 such as customer profiles, folios, messages, and other data. Further, the routing and processing servers 56 may deliver messages and other information to various other servers 70 for formatting and delivery to particular endpoints 20. These servers include email, phone or pager, text-to-voice, instant message, facsimile and US mail servers, among others. The messages are then delivered to the particular endpoints 20. Further processing may include an acknowledgement 72 (or lack thereof), which may be sent back to the original sender through the transaction server 58 and web portal server 60. Also, firewalls 74 can be incorporated throughout the platform architecture in order to safeguard information transmitted over the communications platform 100.

Figure 13:
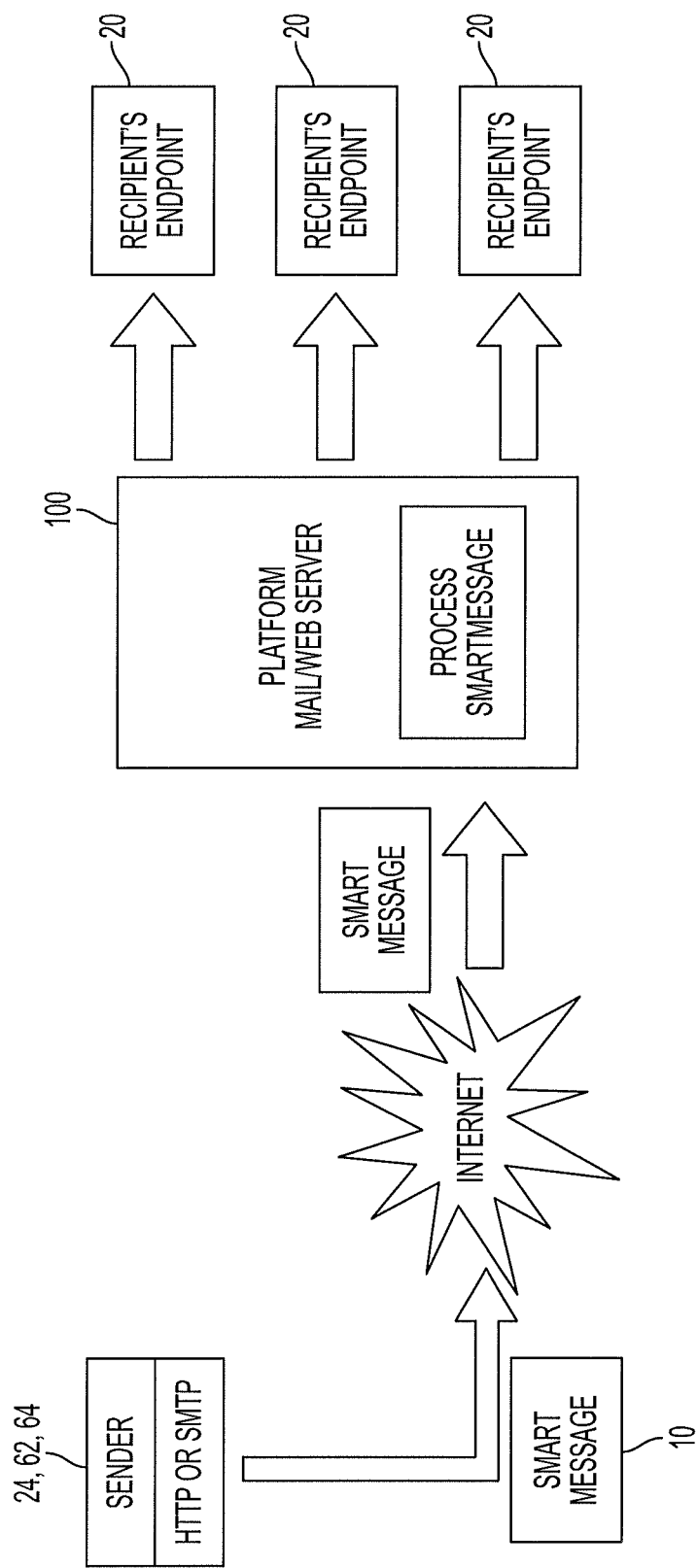
FIG. 13 is a diagram illustrating the flow of the SmartMessage of the present invention.

FIG. 13 represents the simplified flow of a message from the sending source 24, 62, 64 to a SmartMessage processing server. As described above, SmartMessages 10 can be delivered to a SmartMessage processing platform for processing using two of the most commonly used protocols on the internet today—SMTP and HTTP 50, 52.

Initially, (as shown as A in FIG. 13) the Sender 24, 62, 64 generates a SmartMessage 10 and packages it in an email to be sent via SMTP 50, or in a HTTP 52 form to be posted through the HTTP protocol. The SmartMessage 10 travels via the protocol through the Internet 76 and is routed to the platform "mail" server (if sent via SMTP 50) or "web" server (if sent via HTTP 52). The mail/web server processes the incoming package and extracts the SmartMessage 10 from the HTTP 52 request or SMTP 50 mail message. Then the SmartMessage 10 is validated and processed. The SmartMessage 10 is then stored and potentially transmitted and formatted to the recipient's chosen endpoints 20, such as email, wireless, fax, etc.

Another aspect of the present invention is nickname-based routing, which enables outside senders to address specific endpoints 20 such as a user's pager, cell phone, or fax machine by sending messages to the receiver's main address preceded by a specific nickname. For example, a message could be sent to JohnDoe+Cellphone@centerpost.com and be routed directly to John Doe's cell phone. Similarly the message could be sent to JohnDoe+Homephone@centerpost.com and be routed to the receiver's home telephone. The receiver flexibly defines the endpoint 20 such as "Cellphone" or "Homephone" which can be used by senders and also enables or disables direct, nickname-based routing. Nickname-based routing eliminates the need for the sender to memorize multiple, potentially changing addresses for the receiver. Also, the invention will enable dynamic nicknames such as JohnDoe+Fax+3126346580@centerpost.com which will route an outbound message through the platform and out to the specific fax number on behalf of John Doe's account. In this way, users can send messages out through multiple gateways.

Figure 14:
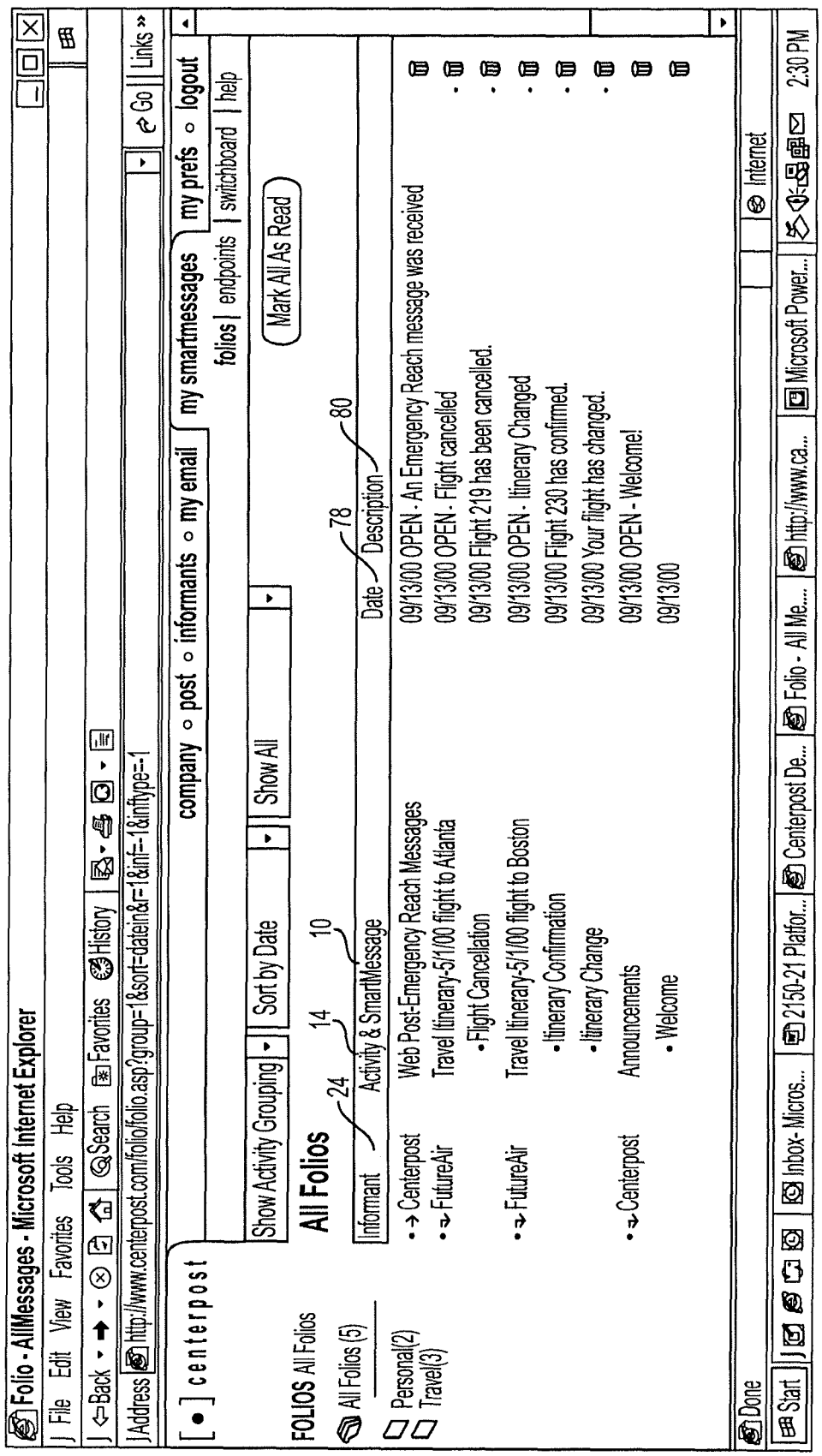
FIG. 14 shows an example of a website page containing folio information in accordance with the present invention.

Another aspect of the present invention is the use of information folios to organize the information that an individual receives. Even though email currently can be organized into folders, it must be done either by the user or by crude filtering methodologies in the user's email program. However, SmartMessages can automatically organize, synthesize, and update themselves. FIG. 14 shows an example of a website containing a folio in accordance with the present invention. Folios also will be accessible to users from multiple devices such as the user's PDA or mobile phone.

Information folios intelligently store, display, and synthesize incoming SmartMessages 10. Folios are organized into "activities" and "events," and can include such information as the Informant 24, the activity 14 and SmartMessage 10, the date 78 and the description 80. Both are definable by the sender. Events apply to activities. Activities can include 1) a bank statement for a given month, 2) an order from an online book seller, 3) a travel itinerary, 4) home alarm status, or 5) messages from a specific person, etc. Events post to an activity and update the activity status based on the definition set by the sender.

For the above examples, events would be 1) a bank statement posting such as payment received, 2) the order confirmation or shipping confirmation, 3) airline booking or rental car confirmation, 4) home alarm events such as a triggered alarm, or 5) individual messages from the specific person, etc. Folios enable complex, detailed information to be automatically organized and summarized based on open, flexible, sender-defined requirements. A folio is like an intelligent, automatic filing assistant. Once given basic instructions, the platform will organize messages, retrieve messages, alert you when important messages come in, etc. Also the "assistant" will know how to respond in a variety of situations including trying to contact the user through a variety of means.

Figure 15A:
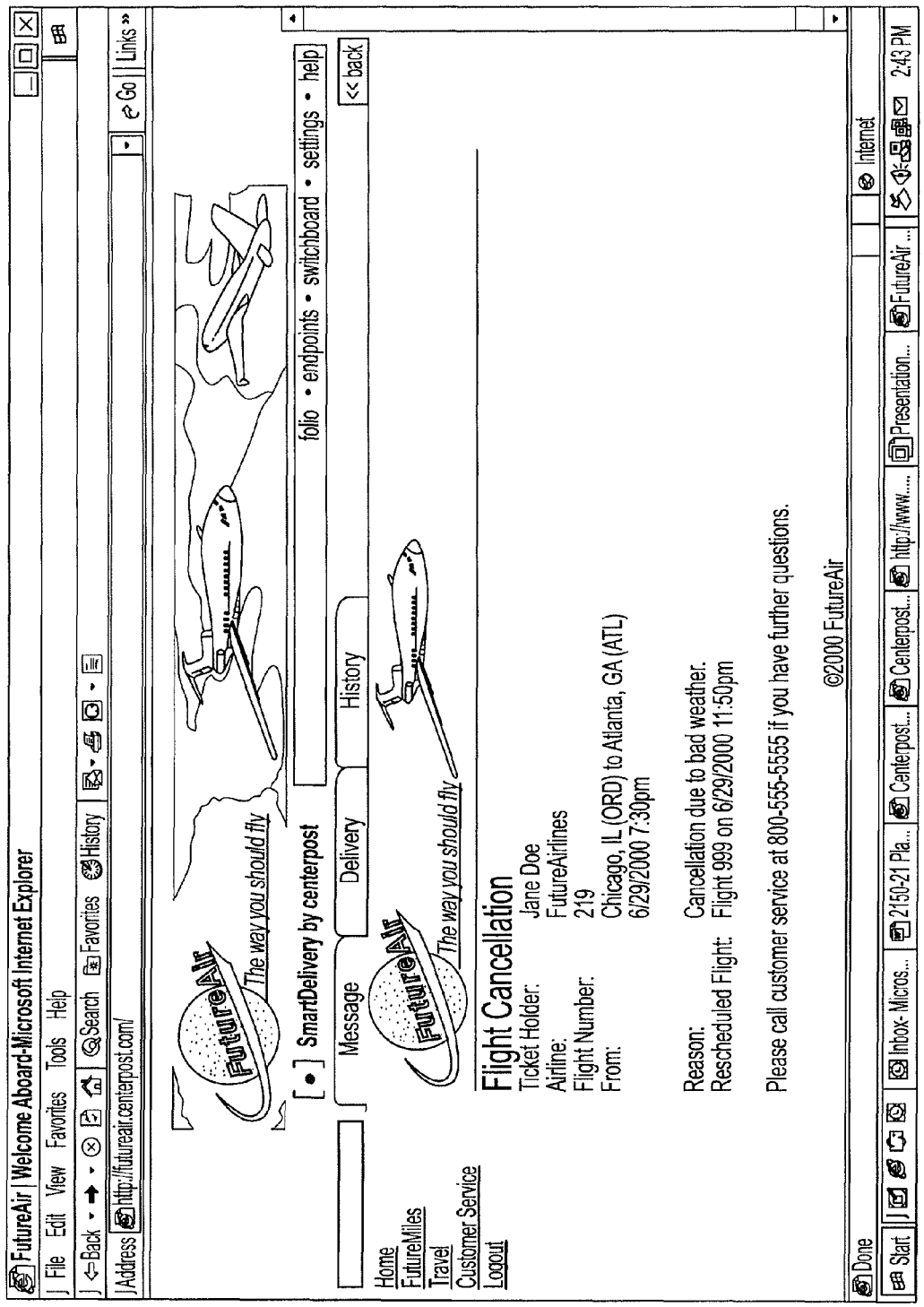
FIG. 15A through 15C show examples of website pages containing message information in accordance with the present invention.

FIGS. 15A through 15F are screen print examples of the Folio aspect of the novel communications platform 100 of the present invention. FIG. 15A is a screen print of a SmartMessage, in this example a SmartMessage from FutureAir, that is automatically sorted and entered into the proper Activity when received. The subscriber can view this SmartMessage at any time to obtain all of the information sent by FutureAir in its SmartMessage. In this case the SmartMessage indicated that Jane Doe's flight number 219 was cancelled due to bad weather.

Figure 15B:
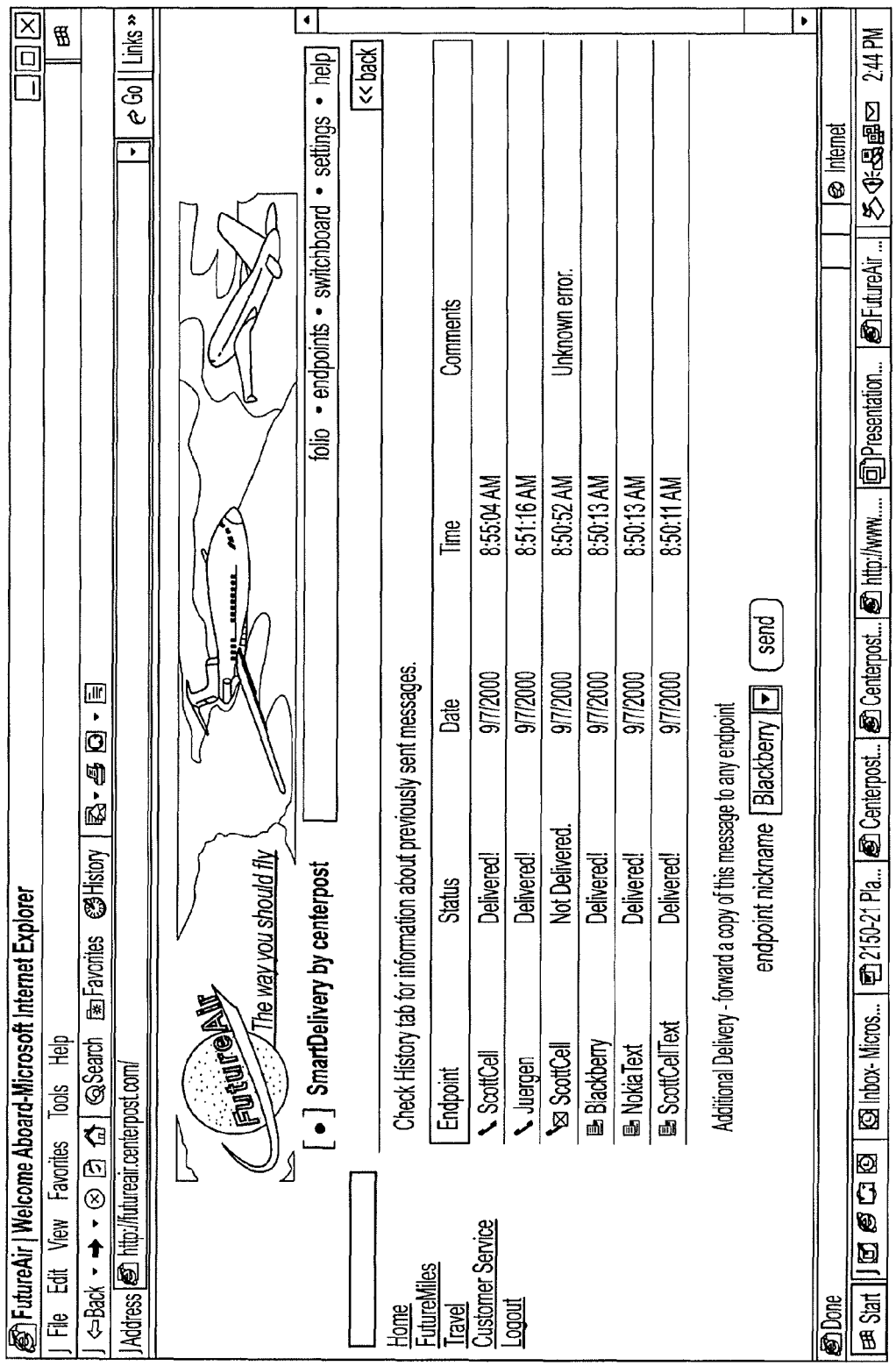

FIG. 15B is a screen print displaying the Delivery information for the particular SmartMessage. In this example, the screen displays the different endpoints that the message was sent to along with the status, date, and time.

Figure 15C:
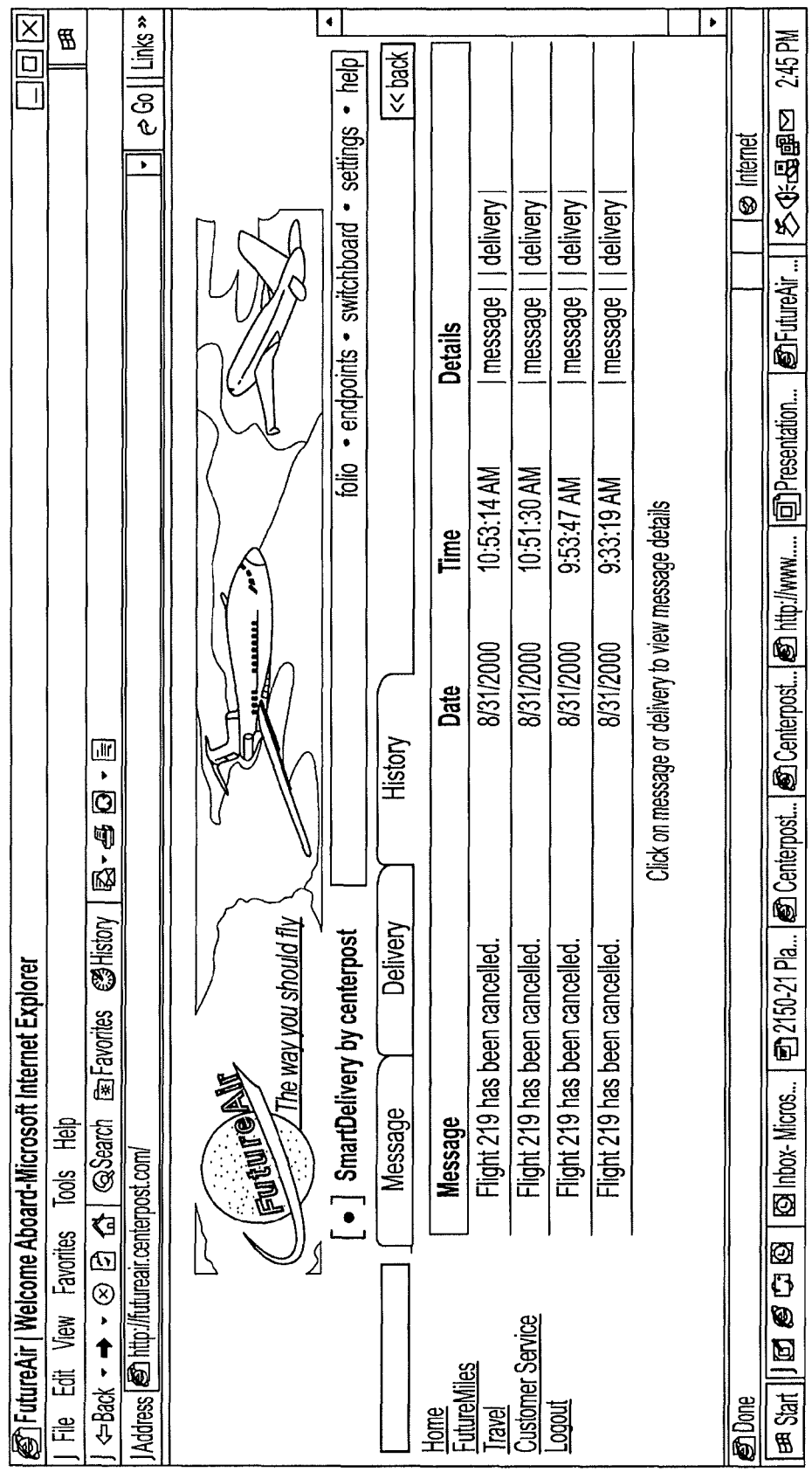

FIG. 15C is a screen print of the history for a particular SmartMessage, in this case, the history for the FutureAir flight described above. The history shows that flight 219 has been cancelled along with details for each time a SmartMessage was sent to the subscriber. The SmartMessage was automatically organized and placed into the proper Folio for review by the subscriber.

Another aspect of the present invention is a website that enables users to quickly define their communications environment and control their electronic communications platform in an intuitive, friendly way; in other words, a point-and-click, drag-and-drop, intelligent communications center. The present invention provides an intelligent, self-configuring, easily controllable personal communications hub, as well as a powerful web-based vehicle to view, organize, and store information. When an individual changes cell phone, pager, or email providers, he or she need only change the address once on the website. This change of a particular endpoint will automatically become part of the user's communication environment, thereby precluding the need for others to have the updated information. As endpoints such as pagers or mobile phones become more and more "intelligent," they will ultimately automatically configure themselves on the platform. Thus, when a user buys, for example, a new cellphone, the platform will receive a SmartMessage from the provider and that endpoint will be automatically setup.

Another aspect of the present invention is an intelligent message delivery platform (Centerpost SmartDelivery), complete with a user interface, which provides many of the advantages of MessageML, without the need for an individual to open a new MessageML account. A corporation can utilize the Centerpost SmartDelivery platform as a service whereby the corporate customers can benefit from the Centerpost platform from the corporation's web site.

SmartDelivery is a service that can be offered via the Centerpost Platform as that platform is described above. The SmartDelivery service allows individuals to experience the benefits of MessageML only on messages from the company sponsoring the SmartDelivery service, or on messages from outside parties approved by the company sponsoring the SmartDelivery service. The SmartDelivery service provides a user interface, which is seamlessly integrated into the corporation's existing web site. These SmartDelivery accounts can be specific to a given corporation, providing these corporations the ability to send SmartMessages (as described herein) to their customers or users through the Centerpost platform. The corporation may also house the user's messaging interface on the corporation's own website.

The SmartDelivery service is designed to provider users with as much of the functionality of the SmartMessage service, without requiring these users to establish a new MessageML account. Instead of creating a new Centerpost account, users can easily complete a user profile on the partner corporation's website, which will identify their endpoints and other information. By completing the user profile, using an easy point and click interface, users can control which messages they receive from the partner corporation, and on which endpoints these messages are received. This function can be accomplished within their existing (or a new) account on the partner corporation's website. For example, after logging in to a user's existing account on a brokerage firm's website, brokerage customers users may be able to set up and manage their SmartDelivery account directly on the brokerage's website, similar to other features located on the brokerage's website.

The SmartDelivery service is necessary because corporations want to offer the advanced messaging features as described above without requiring users to create new accounts. SmartDelivery may include all or a subset of the functionality offered in the Centerpost SmartMessage platform, including folios, endpoints, delivery, settings, etc. Consequently, the Centerpost SmartDelivery service provides a benefit to users as well as to corporations. Users can have messages delivered to a single or multiple endpoints in a matter of seconds. Thus, if a user is not sure whether he will be in his office or in transit, a message can be sent to his office telephone and his cellular telephone at the same time, thereby assuring that the user will receive the message as soon as possible. Additionally, users can easily control which messages they receive on which endpoints with an easy to use graphical interface. Users can also set up their inbox in a manner such that all messages received (and sent) are available for viewing in a single, self-organizing inbox.

With the Centerpost SmartDelivery Service, corporations can send information to their customers on a wide variety of devices (e.g., email, voice, fax, wireless, Instant Messenger). The corporation's customer service representatives can see an audit trail of all messages sent by the corporation, including time-stamped delivery reports.

The information or content pertaining to a particular corporation's SmartDelivery service will only be accessible through the corporation's website. In other words, users will be required to access the SmartDelivery service for a particular corporation through, for example, the user's accounts with that corporation. The functionality will be integrated into the corporation's website using a web page or frame to display Centerpost content. Certain elements of the interface may be customized in order to integrate the Centerpost content with the look and feel of the corporation's website.

In order to implement the Centerpost SmartDelivery platform, each corporation offering the SmartDelivery service would have its own domain of user names. The provider will be responsible for logging the user into their SmartDelivery account on the provider's website. SmartDelivery providers will have full read access to their customers' SmartDelivery accounts.

Only messages from the SmartDelivery provider (or selected partners of that provider) will be capable of being delivered to a user's SmartDelivery account with that provider. The corporation's platform could be configured such that one corporation could not send messages through the other corporation's SmartDelivery account. Thus, messages received from a sender not associated with the particular corporation, or an invalid sender, will be rejected by the system, unless the system is configured to let those messages be delivered. For example, if one stock brokerage company attempted to send a message to the SmartDelivery account of another brokerage firm's customer, the message would not be received by the customer's SmartDelivery account. However, if an airline, with the brokerage firm's permission, sent a message to the brokerage firm customer's SmartDelivery account, that message would be delivered to the account. Similarly, customers could not access their other SmartDelivery accounts with one provider through the website of another provider. (In other words, customers could not access their SmartDelivery account with an airline through their SmartDelivery account with a brokerage firm, or vice versa, unless both SmartDelivery providers permitted it.)

However, if users established a SmartMessage account, messages from their various SmartDelivery accounts could be forwarded to their SmartMessage account without modifying the SmartMessage content. Consequently, these messages would then be managed and coordinated by the Centerpost Platform with full SmartMessage functionality.

Users can choose to forward all of their messages to a Centerpost SmartMessage account. All of the SmartMessages that a user would normally receive at the corporation's SmartDelivery account will be routed to that user's Centerpost SmartMessage account and will be found in the user's SmartDelivery Folio. While the user will not need to access the folio on the corporation's website, the corporation will have the ability to view the user's messages (those that were originally sent to the user at the corporation's SmartDelivery account) through their administrative or customer support site.

Another aspect of the present invention is a component of the Centerpost Platform, the Amateur Informant. An Amateur Informant is an entity that creates and sends SmartMessages through the Centerpost Platform. The objective of the Amateur Informant is to simplify the process of creating SmartMessages, such that individuals, schools, small businesses, etc. can take advantage of the benefits inherent in an XML platform such as the Centerpost Platform. The Amateur Informant provides for the creation and publication of SmartMessages without the usually necessary coding using XML.

The Amateur Informant is required by entities, such as schools and other not-for-profit organizations, individuals, and small businesses, that can benefit from the functionality of SmartMessages, but do not have the technical infrastructure or the individuals that can create SmartMessages in XML, nor the individuals that can manage an XML Message Processing Platform, including information such as the mailing lists, the receivers of the messages, etc. These functions can be expensive and time-consuming. The Amateur Informant is designed to eliminate these barriers.

The Amateur Informant will be accessed through the web. Essential elements of this aspect of the invention include a web-based designer that will allow informants to easily create SmartMessages and SmartMessage style sheets (as described herein). The informants information can be hosted on a web page specific to that informant, which is located on the Amateur Informant website. In addition, this aspect of the invention will incorporate a way for the informant to manage a mailing list, for example, on the Amateur Informant system, without the need to create the informant's own web-based mailing system. For certain applications, i.e., a school mailing list, the receiver of the messages may be allowed certain responsibilities, such as adding or removing names to or from the mailing list, etc. The Amateur Informant also integrates the sending of SmartMessages into a standard, widely used electronic mail program.

The Amateur Informant aspect of the present invention may contain standard SmartMessages that an informant could send. These standard SmartMessages could include, for example, a delivery SmartMessage with the text "I just sent you something", along with the information necessary to track the packages via UPS or Federal Express. Other examples of standard SmartMessages might be an invitation SmartMessage, a newsletter SmartMessage, a reminder SmartMessage, and a change of address SmartMessage, a picture/movie/sound SmartMessages, and a joke SmartMessage.

Another aspect of the present invention is a component of the Centerpost Platform, SmartResponses, which incorporates into the platform the ability for an informant to define and drive automatic 2-way messaging interaction with message senders. Currently, informants are unable to facilitate automatic, real-time, convenient and meaningful 2-way messaging with the recipients of their messages. This aspect of the present invention solves this problem.

With this aspect of the invention, informants send a SmartMessage with a request for a response from the recipient, which is contained in the SmartMessage payload. The recipient will be able to choose from a list of responses originally defined by the informant and carried in the SmartMessage payload. The Centerpost Platform will gather the recipient's answer to the question in the most appropriate form for the device the recipient is using, format the response into the informant's desired format, and send the response back to the informant. With this form of 2-way messaging, the sender has the ability to define in its initial message the content of the XML message it will receive back in response from the recipient, depending on the response selected by the recipient. The content of the initial message, the potential responses by the recipient, and the XML-based messages that will be sent back to the sender all are carried as part of the payload of the initial message. Thus, if a 2-way XML message is received on a cellular telephone, the recipient should be able to respond either by using the keys on the cellular telephone, or by giving a verbal response, which the system will process using voice recognition technology. If the message is received on his PDA, the recipient should be able to reply automatically using the PDA.

For example, if a stock broker sends a SmartMessage to a client informing him that a stock is doing well, and that client receives the message on his cellular telephone, the client, will be able to respond to the message through his cellular telephone to inform his broker that he wants to buy 200 shares of the stock. In the case of an airline, an individual receiving a SmartMessage that his flight has been cancelled, would have the opportunity to rebook the flight by responding to the XML message.

Another aspect of the present invention is a component of the Centerpost Platform, the Personal Portal, which provides access to a subscriber's selected personal information on a secure basis to the subscriber's friends, family, and colleagues.

The Personal Portal provides a subscriber's friends, family, and colleagues with access to the subscriber's contact information, communications endpoints, and location. The Personal Portal comprises a web page that displays information pertaining to the subscriber, i.e., the subscriber's addressable endpoint nicknames, personal information, and current location all could be viewed from this page. The web page could be an endpoint or show a sub-section of the subscriber's folio. As an example, a subscriber could post a travel itinerary to this web page, so colleagues could view flight information, etc. Access to the page could be controlled by the semi-private security system described in a patent application entitled Method Of Controlling Access To Personal Resources, filed concurrently and incorporated herein by reference.

Another aspect of the present invention is a feature of the Centerpost Platform, the endpoint wallet, which provides an XML-based repository of a user's message delivery information and preferences. This may include information such as the user's device addresses, settings, and default delivery options. The endpoint wallet is associated with a specific user, and is independent of the user's accounts.

This aspect of the present invention provides a set of information delivery instructions that a user can carry with them to each website. Thus, when a user visits a retail site, for example, if he has an electronic wallet, his information, including address, credit card number, and shipping information is automatically entered into the website. Similarly, if a user visits a retail site that requests the user to set up notification messages (as described herein), i.e., order confirmation, shipment information, or billing, the endpoint wallet automatically transfers the information to the user's list of endpoints, including the way the user wants information routed by default.

The account platform will recognize the existence of an endpoint wallet, and the user will then confirm that information from the endpoint wallet should be transferred to, or used to populate messaging set-up fields. The endpoint wallet can reside on both the user's device and the Centerpost server.

The objective of this aspect of the invention is to facilitate users attempting to set up and manage endpoints, and also trying to direct the flow of information to those particular endpoints. When a user establishes a new SmartDelivery or SmartMessaging account, the endpoint wallet will populate device information and settings in the account automatically, obviating the need for the user to re-enter these settings and preferences each time a new account is opened.

Another aspect of the present invention is a SmartMessage that automatically sets up a new messaging device or account as an endpoint in a user's SmartMessage account. For example, if an individual purchases a new cellular telephone, that telephone (or service provider) could send a SmartMessage to the user's designated SmartMessage or SmartDelivery account setting itself up as an endpoint.

If the user has no SmartMessage or SmartDelivery account, this message will create a new account and then add the sending device as an endpoint. This invention will minimize the individual's time and effort in setting up and maintaining endpoints. The Centerpost messaging platform will have the capability to watch for these messages and process them appropriately.

With the present invention, among other applications, individuals can receive a variety of valuable event-driven alerts as well as regular text messages, automatically process those alerts leveraging their email boxes, faxes, wireless devices, folios, and other people, view the details or synthesis of the SmartMessages that have been received, send SmartMessages to other subscribers, and intelligently route and process emails.

By sending SmartMessages, corporations can create all types of valuable alerting features that extend beyond email and reduce spamming. Since the invention takes care of complex formatting, routing, and processing functions, corporations can reduce their messaging development cost and complexity.

The invention's SmartMessages enable corporations and individuals to interact in compelling ways that are not effective with email or web browsing. Folios further enable this information to be captured, synthesized, and viewed is a highly organized manner.

Figure 3A:
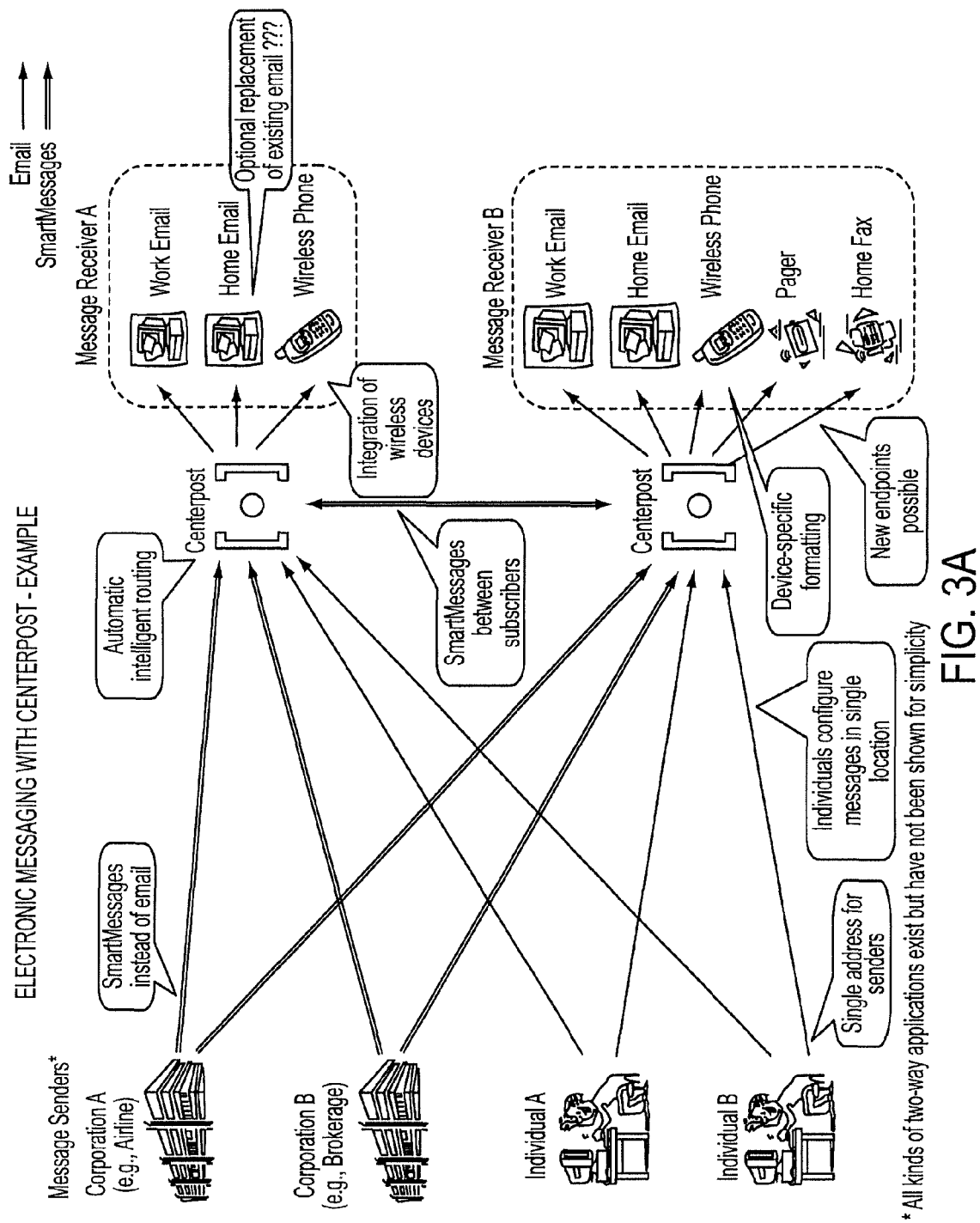
Figure 3B:
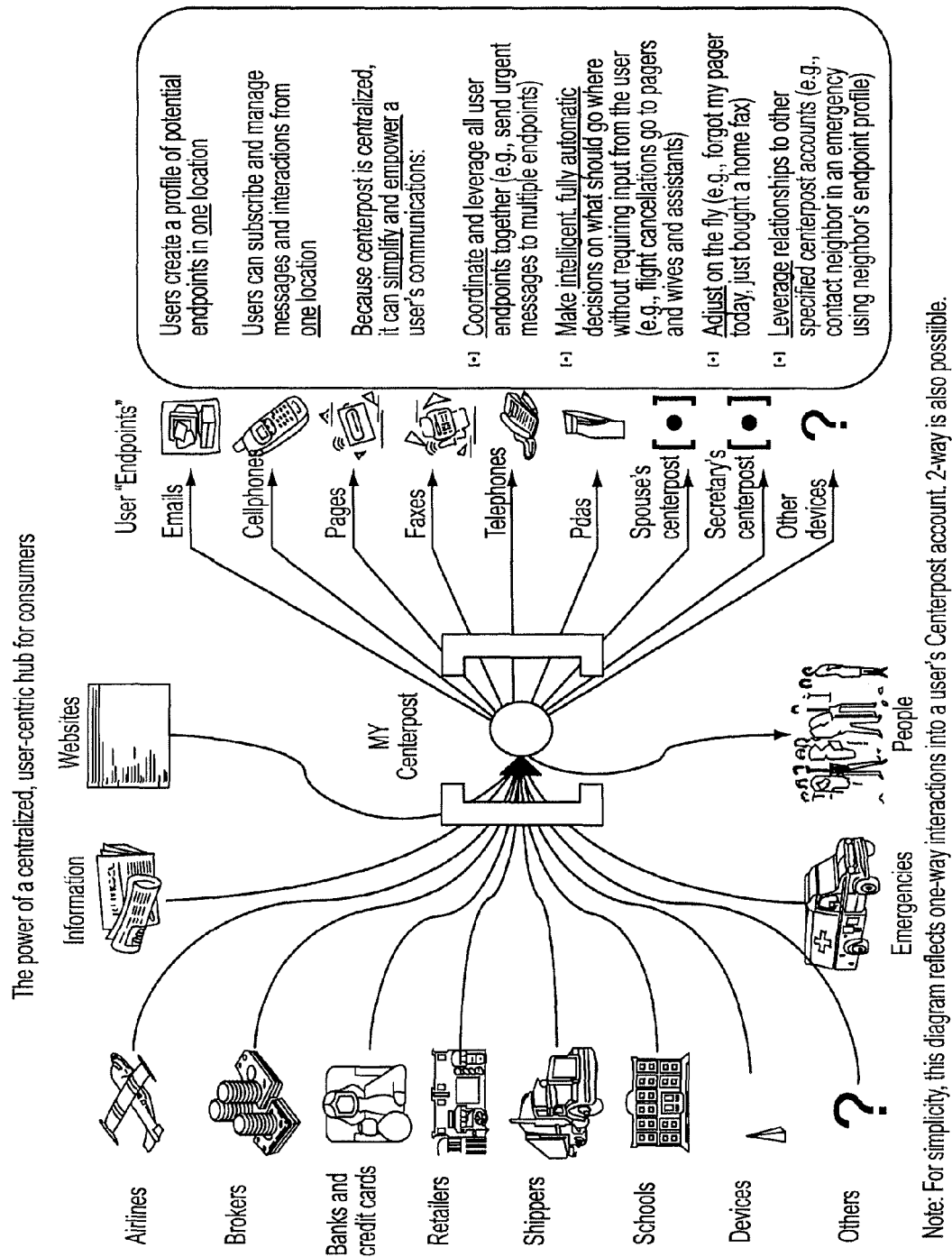

Certain example applications are listed below (see FIG. 3C for additional example applications).

An airline can electronically accompany customers through their travel itinerary:
Send ticket confirmation to work email inbox.
Send confirmation of rental car booking
Send destination weather report to home fax machine 24 hours prior to departure to aid packing
Send gate, baggage claim area, and local traffic report to pager 30 minutes prior to landing.
Send a flight delay alert 1 hour before scheduled departure
Send flight landing confirmation to secretary's email.
The above events can be posted to an activity created around a specific trip itinerary.

Security monitoring companies can keep homeowners aware of activity:
Send alarm notifications to all of spouses' endpoints: work email, pager, PCS phone, and fax.
Send consolidated alarm on/off activity to personal email once/week
The above events can be posted to an activity created around the home alarm status Television and media companies can keep customers aware of changing offerings:
Send TV programming episode information to personal email 24 hours in advance.
Send NFL football programming to pager every Sunday morning.
Send special interest radio programming to work email each morning at start of business.
Send announcements of movie premiers and local theater info as they occur.
Send rental movie titles once/week to personal email.
The above events can be posted to activities organized around program types or time frames.

Financial service firms can send customers all sorts of information, and know their customers will find it manageable because they are SmartMessages:
Send security price, volume, and analyst estimate change alerts to work email and pager.
Send check clearing notification to personal email.
Send trade confirmation to personal email.
Send portfolio positions report to personal email once every business day.
Activities can be created around a person's portfolio, the monthly investment statement, or watch lists.

Retailers and manufacturers can proactively keep customers informed of their order flow:
Send order confirmations to personal email.
Send shipment and order confirmations to a "folio" for subsequent easy retrieval and review.
Send updates on status of long-running or custom-manufactured orders, such as backorder arrived, in route to dealer, and product in test.
Activities can be created around specific orders.

Similarly, the invention enables users to communicate using SmartMessages with other platform users. For example, one user could send a "changed home address" SmartMessage to another user and have it automatically updated in the receiver's address book folio.

The receiving entity does not have to be an individual. As appliances, cars, telemetry devices, and other network devices are connected to the Internet, they can directly receive SmartMessages about maintenance status, parts orders, etc.

The foregoing detailed description of the invention is intended to be illustrative and not intended to limit the scope of the invention. Changes and modifications are possible with respect to the foregoing description, and it is understood that the invention may be practiced otherwise than that specifically described herein and still be within the scope of the claims.

The invention claimed is:

1. A communications platform that enables individuals to receive XML electronic SmartMessages from corporations and others, the communications platform comprising at least one server, said at least one server comprising a processor that executes logic to perform:
a message-processing platform comprising automatic intelligent routing such that said message-processing platform can receive an XML-based electronic SmartMessages from an XML SmartMessage sender and route said XML-based SmartMessage on behalf of an individual user; and
a sender stylesheet and an electronic message stylesheet, wherein said sender stylesheet comprises meta-data that describes a sender and said electronic message stylesheet describes an activity and an event.

2. The communications platform in claim 1, wherein said message processing platform further provides the organization, summation, filing, storage, synthesis, formatting and intelligent processing of XML-based electronic SmartMessages.

3. The communications platform in claim 2, wherein said XML electronic SmartMessage comprises at least one standardized XML tag and at least one sender-defined XML tag.

4. The communications platform in claim 3, wherein said sender-defined XML tag comprises an envelope, said envelope comprising a header and a document.

5. The communications platform in claim 3, wherein said sender-defined XML tag comprises a SmartMessage definition document, wherein said definition document is used by the communications platform to automatically determine how to display, summarize and process the XML electronic SmartMessage.

6. The communications platform in claim 5, wherein said SmartMessage definition document comprises an entity and a class.

7. The communications platform in claim 3, wherein said sender-defined XML tag comprises a receipt document, said receipt document specifies a SmartMessage processing server response.

8. The communications platform in claim 2, further comprising an Informant stylesheet and a SmartMessage stylesheet, wherein said Informant stylesheet describes meta-data pertaining to the sender, said SmartMessage stylesheet describes an activity and an event.

9. The communications platform in claim 8, wherein said meta-data includes information pertaining to the Informant's name, website address, and industry category.

10. The communications platform in claim 8, wherein said Informant stylesheet further authenticates the Informant.

11. The communications platform in claim 8, wherein said SmartMessage Stylesheet further describes the XML schemas of said activity and event, and defines how the activity and event is transmitted to at least one endpoint.

12. The communications platform in claim 11, wherein said at least one endpoint comprises an electronic mail box, a wired or wireless telephone, a facsimile machine, a paging device, or a personal digital assistant.

13. The communications platform in claim 8, wherein said Informant stylesheet and said SmartMessage stylesheet reside on said Informant's web servers.

14. A communications platform that enables individual users to receive electronic messages from corporations and others, the communications platform comprising at least one server, said at least one server comprising a processor that executes logic to perform a nickname-based routing system, said nickname-based routing system configured to enable a sender of an electronic message to transmit said message to the server, an address of the message comprising a recipient identifier component that identifies a recipient registered with the communications platform and a device nickname component that identifies one of a plurality of endpoints of the recipient that are registered with the communications platform as being associated with the recipient, the server configured to receive the message, determine the recipient from the recipient identifier, extract the device nickname from the address and determine an address of an endpoint of the recipient from the recipient identifier and the device nickname and to transmit the message from the server to the endpoint.

15. The communications platform in claim 14, wherein said endpoint comprises an electronic mail box, a wired or wireless telephone, a facsimile machine, a paging device, or a personal digital assistant.

16. The communications platform in claim 15, wherein said nickname-based routing system comprises at least one address containing a nickname.

17. The communications platform in claim 16, wherein said nickname comprises information pertaining to said receiver's name and endpoint.

18. The communications platform in claim 17, wherein said nickname further comprises information pertaining to said endpoint.

19. The communications platform in claim 18, wherein said information pertaining to said endpoint comprises a telephone number, a facsimile number, a pager number, an electronic address or a resident address.

* * * * *